US009967944B2

(12) United States Patent
Fang et al.

(10) Patent No.: US 9,967,944 B2
(45) Date of Patent: May 8, 2018

(54) DIMMING CONTROL FOR LED-BASED LUMINAIRES

(71) Applicant: Cree, Inc., Durham, NC (US)

(72) Inventors: Yuan Fang, Durham, NC (US); David Power, Durham, NC (US)

(73) Assignee: Cree, Inc., Durham, NC (US)

( * ) Notice: Subject to any disclaimer, the term of this patent is extended or adjusted under 35 U.S.C. 154(b) by 0 days. days.

(21) Appl. No.: 15/628,975

(22) Filed: Jun. 21, 2017

(65) Prior Publication Data

US 2017/0374718 A1 Dec. 28, 2017

Related U.S. Application Data

(60) Provisional application No. 62/353,292, filed on Jun. 22, 2016.

(51) Int. Cl.
*H05B 33/08* (2006.01)

(52) U.S. Cl.
CPC ..... *H05B 33/0863* (2013.01); *H05B 33/0815* (2013.01); *H05B 33/0827* (2013.01); *H05B 33/0839* (2013.01); *H05B 33/0845* (2013.01)

(58) Field of Classification Search
CPC .. H05B 37/02; H05B 37/029; H05B 33/0803; H05B 33/0815; H05B 33/0842;
(Continued)

(56) References Cited

U.S. PATENT DOCUMENTS

| D259,514 S | 6/1981 | Welch |
|---|---|---|
| D317,363 S | 6/1991 | Welch |

(Continued)

FOREIGN PATENT DOCUMENTS

| AT | 492840 T | 1/2011 |
|---|---|---|
| AU | 3666702 A | 5/2002 |

(Continued)

OTHER PUBLICATIONS

Author Unknown, "Cluster Analysis", Wikipedia—the free encyclopedia, Updated May 21, 2013, Retrieved on May 30, 2013, http://en.wikipedia.org/wiki/cluster_analysis, 16 pages.

(Continued)

*Primary Examiner* — Haissa Philogene
(74) *Attorney, Agent, or Firm* — Withrow & Terranova, P.L.L.C.

(57) ABSTRACT

A PWM dimmer includes a source terminal, a load terminal, a power stage, an interface, and control circuitry. The power stage is coupled between the source terminal and the load terminal and is configured to receive from the source terminal an AC supply signal and provide a pulsed AC load signal to the load terminal in response to a control signal. The AC supply signal has a sinusoidal envelope with a positive half-cycle and a negative half-cycle for each cycle. The pulsed AC load signal tracks the envelope and includes a plurality of pulses in the positive half-cycle and the negative half-cycle for each cycle. The interface is configured to receive dimming control information bearing on a dimming level from a user or remote terminal. The control circuitry is configured to receive the dimming control information from the interface and generate the control signal based on the dimming control information.

29 Claims, 20 Drawing Sheets

(58) Field of Classification Search
CPC ........... H05B 33/0845; H05B 33/0863; H05B 41/28; H05B 41/2828; H05B 41/3927; H05B 41/3925; H05B 33/0827; H05B 33/0839; F21V 23/003; Y02B 20/346; Y02B 70/145; H02M 1/10; H02M 5/225; H02M 7/4807

See application file for complete search history.

(56) References Cited

U.S. PATENT DOCUMENTS

| | | |
|---|---|---|
| 5,079,680 A | 1/1992 | Kohn |
| D344,361 S | 2/1994 | Friedman et al. |
| D349,582 S | 8/1994 | Bain et al. |
| 5,471,119 A | 11/1995 | Ranganath et al. |
| D373,438 S | 9/1996 | McCann-Compton et al. |
| 6,100,643 A | 8/2000 | Nilssen |
| 6,118,230 A | 9/2000 | Fleischmann |
| 6,137,408 A | 10/2000 | Okada |
| 6,160,359 A | 12/2000 | Fleischmann |
| 6,166,496 A | 12/2000 | Lys et al. |
| 6,211,626 B1 | 4/2001 | Lys et al. |
| 6,437,692 B1 | 8/2002 | Petite et al. |
| 6,441,558 B1 | 8/2002 | Muthu et al. |
| 6,528,954 B1 | 3/2003 | Lys et al. |
| 6,553,218 B1 | 4/2003 | Boesjes |
| 6,735,630 B1 | 5/2004 | Gelvin et al. |
| 6,804,790 B2 | 10/2004 | Rhee et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,914,893 B2 | 7/2005 | Petite |
| 6,975,851 B2 | 12/2005 | Boesjes |
| 6,990,394 B2 | 1/2006 | Pasternak |
| 7,009,348 B2 | 3/2006 | Mogilner et al. |
| 7,020,701 B1 | 3/2006 | Gelvin et al. |
| 7,031,920 B2 | 4/2006 | Dowling et al. |
| 7,103,511 B2 | 9/2006 | Petite |
| 7,139,562 B2 | 11/2006 | Matsui |
| 7,288,902 B1 | 10/2007 | Melanson |
| 7,305,467 B2 | 12/2007 | Kaiser et al. |
| 7,313,399 B2 | 12/2007 | Rhee et al. |
| D560,006 S | 1/2008 | Garner et al. |
| 7,344,279 B2 | 3/2008 | Mueller et al. |
| D565,771 S | 4/2008 | Garner et al. |
| D567,431 S | 4/2008 | Garner et al. |
| 7,391,297 B2 | 6/2008 | Cash et al. |
| 7,443,113 B2 * | 10/2008 | Crouse .............. H05B 41/2828 315/291 |
| D582,598 S | 12/2008 | Kramer et al. |
| 7,468,661 B2 | 12/2008 | Petite et al. |
| 7,482,567 B2 | 1/2009 | Hoelen et al. |
| 7,484,008 B1 | 1/2009 | Gelvin et al. |
| D586,950 S | 2/2009 | Garner et al. |
| D587,390 S | 2/2009 | Garner et al. |
| D588,064 S | 3/2009 | Garner et al. |
| 7,522,563 B2 | 4/2009 | Rhee |
| D594,576 S | 6/2009 | Chan et al. |
| 7,587,289 B1 | 9/2009 | Sivertsen |
| 7,606,572 B2 | 10/2009 | Rhee et al. |
| 7,638,743 B2 | 12/2009 | Bartol et al. |
| 7,649,456 B2 | 1/2010 | Wakefield et al. |
| 7,657,249 B2 | 2/2010 | Boesjes |
| 7,683,301 B2 | 3/2010 | Papamichael et al. |
| 7,697,492 B2 | 4/2010 | Petite |
| 7,797,367 B1 | 9/2010 | Gelvin et al. |
| 7,844,308 B2 | 11/2010 | Rhee et al. |
| 7,844,687 B1 | 11/2010 | Gelvin et al. |
| 7,868,562 B2 | 1/2011 | Salsbury et al. |
| 7,891,004 B1 | 2/2011 | Gelvin et al. |
| 7,904,569 B1 | 3/2011 | Gelvin et al. |
| 7,924,174 B1 | 4/2011 | Gananathan |
| 7,924,927 B1 | 4/2011 | Boesjes |
| 7,948,930 B2 | 5/2011 | Rhee |
| 8,011,794 B1 | 9/2011 | Sivertsen |
| 8,013,545 B2 | 9/2011 | Jonsson |
| 8,021,021 B2 | 9/2011 | Paolini |
| 8,035,320 B2 | 10/2011 | Sibert |
| 8,079,118 B2 | 12/2011 | Gelvin et al. |
| 8,098,615 B2 | 1/2012 | Rhee |
| 8,126,429 B2 | 2/2012 | Boesjes |
| 8,140,658 B1 | 3/2012 | Gelvin et al. |
| D663,048 S | 7/2012 | Chen |
| 8,228,163 B2 | 7/2012 | Cash |
| 8,271,058 B2 | 9/2012 | Rhee et al. |
| 8,274,928 B2 | 9/2012 | Dykema et al. |
| 8,275,471 B2 | 9/2012 | Huizenga et al. |
| 8,344,660 B2 | 1/2013 | Mohan et al. |
| 8,364,325 B2 | 1/2013 | Huizenga et al. |
| 8,425,071 B2 | 4/2013 | Ruud et al. |
| 8,461,781 B2 | 6/2013 | Schenk et al. |
| 8,466,626 B2 | 6/2013 | Null et al. |
| 8,497,634 B2 | 7/2013 | Scharf |
| 8,508,137 B2 | 8/2013 | Reed |
| 8,511,851 B2 | 8/2013 | Van de Ven et al. |
| 8,536,792 B1 | 9/2013 | Roosli |
| 8,536,984 B2 | 9/2013 | Benetz et al. |
| 8,564,215 B2 | 10/2013 | Okawa et al. |
| 8,591,062 B2 | 11/2013 | Hussell et al. |
| 8,596,819 B2 | 12/2013 | Negley et al. |
| 8,604,714 B2 | 12/2013 | Mohan et al. |
| 8,610,377 B2 | 12/2013 | Chemel et al. |
| 8,622,584 B2 | 1/2014 | Kinnune et al. |
| 8,626,318 B2 | 1/2014 | Wu |
| D703,841 S | 4/2014 | Feng et al. |
| D708,360 S | 7/2014 | Shibata et al. |
| 8,777,449 B2 | 7/2014 | Van De Ven et al. |
| 8,786,191 B2 | 7/2014 | Kuang et al. |
| 8,829,800 B2 | 9/2014 | Harris |
| 8,829,821 B2 | 9/2014 | Chobot et al. |
| 8,912,735 B2 | 12/2014 | Chobot et al. |
| 8,975,825 B2 | 3/2015 | Hu |
| 8,981,671 B2 | 3/2015 | Karasawa et al. |
| 9,028,087 B2 | 5/2015 | Wilcox et al. |
| 9,041,315 B2 | 5/2015 | Cho et al. |
| 9,155,165 B2 | 10/2015 | Chobot |
| 9,155,166 B2 | 10/2015 | Chobot |
| 9,182,096 B2 | 11/2015 | Kinnune et al. |
| D744,699 S | 12/2015 | Inoue et al. |
| 9,232,596 B2 * | 1/2016 | Jelaca ................ H05B 33/0845 |
| 9,326,358 B2 | 4/2016 | Campbell et al. |
| 9,332,619 B2 * | 5/2016 | Olsen ..................... F21S 8/026 |
| 9,351,381 B2 | 5/2016 | Verfuerth et al. |
| 9,408,268 B2 | 8/2016 | Recker et al. |
| 9,433,061 B2 * | 8/2016 | Chobot ................ H05B 37/029 |
| 9,504,133 B2 | 11/2016 | Verfuerth et al. |
| 9,538,617 B2 | 1/2017 | Rains, Jr. et al. |
| 9,572,226 B2 * | 2/2017 | Motley ................. H05B 37/02 |
| 9,618,163 B2 | 4/2017 | Power et al. |
| 9,762,115 B2 * | 9/2017 | Sharma .................. H02M 1/10 |
| 2002/0047646 A1 | 4/2002 | Lys et al. |
| 2002/0195975 A1 | 12/2002 | Schanberger et al. |
| 2004/0001963 A1 | 1/2004 | Watanabe et al. |
| 2004/0002792 A1 | 1/2004 | Hoffknecht |
| 2004/0051467 A1 | 3/2004 | Balasubramaniam et al. |
| 2004/0193741 A1 | 9/2004 | Pereira et al. |
| 2004/0232851 A1 | 11/2004 | Roach, Jr. et al. |
| 2005/0127381 A1 | 6/2005 | Vitta et al. |
| 2005/0132080 A1 | 6/2005 | Rhee et al. |
| 2006/0022214 A1 | 2/2006 | Morgan et al. |
| 2006/0044152 A1 | 3/2006 | Wang |
| 2006/0066266 A1 | 3/2006 | Li Lim et al. |
| 2006/0125426 A1 | 6/2006 | Veskovic et al. |
| 2006/0262545 A1 | 11/2006 | Piepgras et al. |
| 2007/0013557 A1 | 1/2007 | Wang et al. |
| 2007/0040512 A1 | 2/2007 | Jungwirth et al. |
| 2007/0085700 A1 | 4/2007 | Walters et al. |
| 2007/0126656 A1 | 6/2007 | Huang et al. |
| 2007/0132405 A1 | 6/2007 | Hillis et al. |
| 2007/0189000 A1 | 8/2007 | Papamichael et al. |
| 2007/0291483 A1 | 12/2007 | Lys |
| 2008/0031213 A1 | 2/2008 | Kaiser et al. |
| 2008/0088435 A1 | 4/2008 | Cash et al. |
| 2008/0197790 A1 | 8/2008 | Mangiaracina et al. |

(56) References Cited

U.S. PATENT DOCUMENTS

| | | |
|---|---|---|
| 2008/0218087 A1 | 9/2008 | Crouse et al. |
| 2008/0265799 A1 | 10/2008 | Sibert |
| 2009/0021955 A1 | 1/2009 | Kuang et al. |
| 2009/0026966 A1 | 1/2009 | Budde et al. |
| 2009/0184616 A1 | 7/2009 | Van De Ven et al. |
| 2009/0212718 A1 | 8/2009 | Kawashima et al. |
| 2009/0230894 A1 | 9/2009 | De Goederen et al. |
| 2009/0231832 A1 | 9/2009 | Zukauskas et al. |
| 2009/0237011 A1 | 9/2009 | Shah et al. |
| 2009/0267540 A1 | 10/2009 | Chemel et al. |
| 2009/0284169 A1 | 11/2009 | Valois |
| 2009/0284184 A1 | 11/2009 | Valois et al. |
| 2009/0302994 A1 | 12/2009 | Rhee et al. |
| 2009/0302996 A1 | 12/2009 | Rhee et al. |
| 2009/0305644 A1 | 12/2009 | Rhee et al. |
| 2009/0315485 A1 | 12/2009 | Verfuerth et al. |
| 2009/0315668 A1 | 12/2009 | Leete, III et al. |
| 2010/0007289 A1 | 1/2010 | Budike, Jr. |
| 2010/0084992 A1 | 4/2010 | Valois et al. |
| 2010/0128634 A1 | 5/2010 | Rhee et al. |
| 2010/0134051 A1 | 6/2010 | Huizenga et al. |
| 2010/0148940 A1 | 6/2010 | Gelvin et al. |
| 2010/0150122 A1 | 6/2010 | Berger et al. |
| 2010/0201516 A1 | 8/2010 | Gelvin et al. |
| 2010/0203515 A1 | 8/2010 | Rigler |
| 2010/0270935 A1 | 10/2010 | Otake et al. |
| 2010/0295473 A1 | 11/2010 | Chemel et al. |
| 2010/0301770 A1 | 12/2010 | Chemel et al. |
| 2010/0301773 A1 | 12/2010 | Chemel et al. |
| 2010/0301774 A1 | 12/2010 | Chemel et al. |
| 2010/0308664 A1 | 12/2010 | Face et al. |
| 2011/0025469 A1 | 2/2011 | Erdmann et al. |
| 2011/0031897 A1 | 2/2011 | Henig et al. |
| 2011/0035491 A1 | 2/2011 | Gelvin et al. |
| 2011/0057581 A1 | 3/2011 | Ashar et al. |
| 2011/0080120 A1 | 4/2011 | Talstra et al. |
| 2011/0095687 A1 | 4/2011 | Jonsson |
| 2011/0095709 A1 | 4/2011 | Diehl et al. |
| 2011/0101871 A1 | 5/2011 | Schenk et al. |
| 2011/0115407 A1 | 5/2011 | Wibben et al. |
| 2011/0133655 A1 | 6/2011 | Recker et al. |
| 2011/0137757 A1 | 6/2011 | Paolini et al. |
| 2011/0156596 A1 | 6/2011 | Salsbury |
| 2011/0178650 A1 | 7/2011 | Picco |
| 2011/0182065 A1 | 7/2011 | Negley et al. |
| 2011/0199004 A1 | 8/2011 | Henig et al. |
| 2011/0199020 A1 | 8/2011 | Henig et al. |
| 2011/0215725 A1 | 9/2011 | Paolini |
| 2011/0221350 A1 | 9/2011 | Staab |
| 2011/0249441 A1 | 10/2011 | Donegan |
| 2011/0254554 A1 | 10/2011 | Harbers |
| 2011/0298598 A1 | 12/2011 | Rhee |
| 2012/0007725 A1 | 1/2012 | Penisoara et al. |
| 2012/0013257 A1 | 1/2012 | Sibert |
| 2012/0026733 A1 | 2/2012 | Graeber et al. |
| 2012/0040606 A1 | 2/2012 | Verfuerth |
| 2012/0050535 A1 | 3/2012 | Densham et al. |
| 2012/0051041 A1 | 3/2012 | Edmond et al. |
| 2012/0079149 A1 | 3/2012 | Gelvin et al. |
| 2012/0082062 A1 | 4/2012 | Mccormack |
| 2012/0086345 A1 | 4/2012 | Tran |
| 2012/0087290 A1 | 4/2012 | Rhee et al. |
| 2012/0091915 A1 | 4/2012 | Ilyes et al. |
| 2012/0126705 A1 | 5/2012 | Pezzutti et al. |
| 2012/0130544 A1 | 5/2012 | Mohan et al. |
| 2012/0135692 A1 | 5/2012 | Feri et al. |
| 2012/0136485 A1 | 5/2012 | Weber et al. |
| 2012/0139426 A1 | 6/2012 | Ilyes et al. |
| 2012/0147604 A1 | 6/2012 | Farmer |
| 2012/0147808 A1 | 6/2012 | Rhee |
| 2012/0153840 A1 | 6/2012 | Dahlen et al. |
| 2012/0161643 A1 | 6/2012 | Henig et al. |
| 2012/0176041 A1 | 7/2012 | Birru |
| 2012/0206050 A1 | 8/2012 | Spero |
| 2012/0223657 A1 | 9/2012 | Van de Ven |
| 2012/0224457 A1 | 9/2012 | Kim et al. |
| 2012/0229048 A1 | 9/2012 | Archer |
| 2012/0230696 A1 | 9/2012 | Pederson et al. |
| 2012/0235579 A1 | 9/2012 | Chemel et al. |
| 2012/0235600 A1 | 9/2012 | Simonian et al. |
| 2012/0242242 A1 | 9/2012 | Linz et al. |
| 2012/0242254 A1 | 9/2012 | Kim et al. |
| 2012/0271477 A1 | 10/2012 | Okubo et al. |
| 2012/0280638 A1 | 11/2012 | Pereira et al. |
| 2012/0299485 A1 | 11/2012 | Mohan et al. |
| 2012/0306375 A1 | 12/2012 | van de Ven |
| 2012/0306377 A1 | 12/2012 | Igaki et al. |
| 2012/0320262 A1 | 12/2012 | Chung |
| 2012/0327650 A1 | 12/2012 | Lay et al. |
| 2013/0002157 A1 | 1/2013 | van de Ven et al. |
| 2013/0002167 A1 | 1/2013 | Van de Ven |
| 2013/0013091 A1 | 1/2013 | Cavalcanti et al. |
| 2013/0026953 A1 | 1/2013 | Woytowitz |
| 2013/0033872 A1 | 2/2013 | Randolph et al. |
| 2013/0049606 A1 | 2/2013 | Ferstl et al. |
| 2013/0051806 A1 | 2/2013 | Quilici et al. |
| 2013/0057395 A1 | 3/2013 | Ohashi |
| 2013/0058258 A1 | 3/2013 | Boesjes |
| 2013/0063042 A1 | 3/2013 | Bora et al. |
| 2013/0063047 A1 | 3/2013 | Veskovic |
| 2013/0069539 A1 | 3/2013 | So |
| 2013/0075484 A1 | 3/2013 | Rhee et al. |
| 2013/0077299 A1 | 3/2013 | Hussell et al. |
| 2013/0088168 A1 | 4/2013 | Mohan et al. |
| 2013/0093328 A1 | 4/2013 | Ivey et al. |
| 2013/0147366 A1 | 6/2013 | Huizenga et al. |
| 2013/0154831 A1 | 6/2013 | Gray et al. |
| 2013/0155392 A1 | 6/2013 | Barrilleaux et al. |
| 2013/0155672 A1 | 6/2013 | Vo et al. |
| 2013/0200805 A1 | 8/2013 | Scapa et al. |
| 2013/0221857 A1 | 8/2013 | Bowers |
| 2013/0229784 A1 | 9/2013 | Lessard et al. |
| 2013/0257292 A1 | 10/2013 | Verfuerth et al. |
| 2013/0320862 A1 | 12/2013 | Campbell et al. |
| 2013/0328486 A1 | 12/2013 | Jones |
| 2013/0342911 A1 | 12/2013 | Bartol et al. |
| 2014/0001952 A1 | 1/2014 | Harris et al. |
| 2014/0001959 A1 | 1/2014 | Motley et al. |
| 2014/0001962 A1 | 1/2014 | Harris |
| 2014/0001963 A1 | 1/2014 | Chobot et al. |
| 2014/0001972 A1 | 1/2014 | Harris et al. |
| 2014/0001977 A1 | 1/2014 | Zacharchuk et al. |
| 2014/0062678 A1 | 3/2014 | de Clercq et al. |
| 2014/0070710 A1 | 3/2014 | Harris |
| 2014/0167621 A1 | 6/2014 | Trott et al. |
| 2014/0167646 A1 | 6/2014 | Zukauskas et al. |
| 2014/0212090 A1 | 7/2014 | Wilcox et al. |
| 2014/0232299 A1 | 8/2014 | Wang |
| 2014/0268790 A1 | 9/2014 | Chobot et al. |
| 2014/0312777 A1 | 10/2014 | Shearer et al. |
| 2014/0347885 A1 | 11/2014 | Wilcox et al. |
| 2014/0355302 A1 | 12/2014 | Wilcox et al. |
| 2015/0008827 A1 | 1/2015 | Carrigan et al. |
| 2015/0008828 A1 | 1/2015 | Carrigan et al. |
| 2015/0008829 A1 | 1/2015 | Lurie et al. |
| 2015/0008831 A1 | 1/2015 | Carrigan et al. |
| 2015/0015145 A1 | 1/2015 | Carrigan et al. |
| 2015/0022096 A1 | 1/2015 | Deixler |
| 2015/0042243 A1 | 2/2015 | Picard |
| 2015/0048758 A1 | 2/2015 | Carrigan et al. |
| 2015/0160673 A1 | 6/2015 | Vasylyev |
| 2015/0195883 A1 | 7/2015 | Harris et al. |
| 2015/0253488 A1 | 9/2015 | Wilcox et al. |
| 2015/0264780 A1 | 9/2015 | Harris et al. |
| 2015/0345762 A1 | 12/2015 | Creasman et al. |
| 2015/0351169 A1 | 12/2015 | Pope et al. |

(56) References Cited

U.S. PATENT DOCUMENTS

| | | | | |
|---|---|---|---|---|
| 2015/0351187 | A1* | 12/2015 | McBryde | H05B 33/086 315/185 R |
| 2015/0351191 | A1 | 12/2015 | Pope et al. | |
| 2016/0029464 | A1 | 1/2016 | Hughes et al. | |

FOREIGN PATENT DOCUMENTS

| | | |
|---|---|---|
| AU | 2002219810 A8 | 5/2002 |
| AU | 2002352922 A1 | 6/2003 |
| CA | 2426769 A1 | 5/2002 |
| CA | 2511368 A1 | 5/2002 |
| CN | 101461151 A | 6/2009 |
| CN | 102119507 A | 7/2011 |
| DE | 60143707 D1 | 2/2011 |
| EP | 1330699 A1 | 7/2003 |
| EP | 1334608 A2 | 8/2003 |
| EP | 1461907 A1 | 9/2004 |
| EP | 1719363 A2 | 11/2006 |
| EP | 1886415 A2 | 2/2008 |
| EP | 2304311 A1 | 4/2011 |
| EP | 2327184 A1 | 6/2011 |
| EP | 2440017 A2 | 4/2012 |
| HK | 1114508 | 10/2008 |
| IN | 4576/KOLNP/2007 | 7/2008 |
| JP | H11345690 A | 12/1999 |
| JP | 2001155870 A | 6/2001 |
| JP | 2003178889 A | 6/2003 |
| JP | 2005510956 A | 4/2005 |
| JP | 3860116 B2 | 12/2006 |
| JP | 3896573 B2 | 3/2007 |
| JP | 2010050069 A | 3/2010 |
| JP | 2010198877 A | 9/2010 |
| JP | 2011526414 A | 10/2011 |
| JP | 2012226993 A | 11/2012 |
| KR | 20060050614 A | 5/2006 |
| KR | 20080025095 A | 3/2008 |
| KR | 20110001782 A | 1/2011 |
| KR | 20110095510 A | 8/2011 |
| WO | 0126068 A1 | 4/2001 |
| WO | 0126327 A2 | 4/2001 |
| WO | 0126328 A2 | 4/2001 |
| WO | 0126329 A2 | 4/2001 |
| WO | 0126331 A2 | 4/2001 |
| WO | 0126332 A2 | 4/2001 |
| WO | 0126333 A2 | 4/2001 |
| WO | 0126334 A2 | 4/2001 |
| WO | 0126335 A2 | 4/2001 |
| WO | 0126338 A2 | 4/2001 |
| WO | 0239242 A1 | 5/2002 |
| WO | 0241604 A2 | 5/2002 |
| WO | 03047175 A1 | 6/2003 |
| WO | 2004109966 A2 | 12/2004 |
| WO | 2006095316 A1 | 9/2006 |
| WO | 2006130662 A2 | 12/2006 |
| WO | 2007102097 A1 | 9/2007 |
| WO | 2009011898 A2 | 1/2009 |
| WO | 2009076492 A1 | 6/2009 |
| WO | 2009145747 A1 | 12/2009 |
| WO | 2009151416 A1 | 12/2009 |
| WO | 2009158514 A1 | 12/2009 |
| WO | 2010010493 A2 | 4/2010 |
| WO | 2010047971 A2 | 4/2010 |
| WO | 2010122457 A2 | 10/2010 |
| WO | 2011070058 A2 | 6/2011 |
| WO | 2011087681 A1 | 7/2011 |
| WO | 2011090938 A1 | 7/2011 |
| WO | 2011152968 A1 | 12/2011 |
| WO | 2012112813 A2 | 8/2012 |
| WO | 2012125502 A2 | 9/2012 |
| WO | 2013050970 A1 | 4/2013 |
| WO | 2014120971 A1 | 8/2014 |

OTHER PUBLICATIONS

Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Data Terminal Equipment (DTE) Power Via Media Dependent Interface (MDI)," Standard 802.3af-2003, Jun. 18, 2003, The Institute of Electrical and Electronics Engineers, Inc., 133 pages.

Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment 3: Data Terminal Equipment (DTE) Power via the Media Dependent Interface (MDI) Enhancements," Standard 802.3at-2009, Sep. 11, 2009, The Institute of Electrical and Electronics Engineers, Inc., 141 pages.

Author Unknown, "Multi-Agent System", Wikipedia—The free encyclopedia, Updated Apr. 18, 2013, Retrieved May 30, 2013, http://en.wikipedia.org/wiki/multi-agent_system, 7 pages.

Author Unknown, i2C-Bus: What's That?, Updated 2012, Retrieved May 30, 2013, http://www.i2c-bus.org, 1 page.

Kuhn, Fabian et al., "Initializing Newly Deployed Ad Hoc & Sensor Network", The Tenth Annual International Conference on Mobile Computing and Networking (MobiCom '04), Sep. 26-Oct. 4, 2004, 15 pages, Philadelphia, PA.

Teasdale, Dana et al., "Annual Technical Progress Report: Adapting Wireless Technology to Lighting Control and Environmental Sensing," Dust Networks, Aug. 1, 2004, 41 pages.

Digeronimo, John, "Search Report," EIC 2800, Tracking No. 533769, Scientific & Technical Information Center, Feb. 1, 2017, 16 pages.

Author Unknown, "Controlling LEDs," Lutron Electronics Co., Inc., Jan. 1, 2011, 16 pages.

Author Unknown, "Section 16950: Distributed Digital Lighting Control System," Lighting Control Devices, Apr. 30, 2013, 20 pages.

Author Unknown, "System Design Guide—Lighting Control & Design: System Overview," Lighting Control and Design, Form No. 1382.057, Accessed Aug. 9, 2013, 4 pages.

Author Unknown, "System Overview & Introduction," nLight Network Lighting Controls, Accessed: Aug. 9, 2013, 4 pages, http://nlightcontrols.com/lighting-controls/overview.

Author Unknown, "The System: Components," Simply5, Accessed: Aug. 9, 2013, 2 pages, http://simply5.net/how.html.

Technical Publications Department At Creston, "Creston Green Light Commercial Lighting Design Guide," Creston Electronics, Inc., 2013, 74 pages.

* cited by examiner

DIMMING CONTROL FOR LED-BASED LUMINAIRES

RELATED APPLICATIONS

This application claims the benefit of provisional patent application Ser. No. 62/353,292, filed Jun. 22, 2016, the disclosure of which is hereby incorporated herein by reference in its entirety. This application is related to commonly assigned U.S. patent application Ser. No. 14/292,286, now U.S. Pat. No. 9,618,163, entitled LIGHTING FIXTURE PROVIDING VARIABLE CCT, which was filed on May 30, 2014, the disclosure of which is hereby incorporated herein by reference in its entirety.

FIELD OF THE DISCLOSURE

The present disclosure relates to controls for LED-based luminaires and in particular to controlling the state and lighting characteristics, such as dimming levels, CCTs, and the like, of LED-based luminaires.

BACKGROUND

As incandescent lighting is being phased out, LED lighting is presenting itself as both a cost effective and desirable replacement. However, existing switches, dimmers, lighting fixtures, and other infrastructure components are designed to work with traditional incandescent luminaires that employ Edison-style bases. As such, LED-based luminaires, such as LED-based light bulbs, are often designed to simply replace incandescent luminaires in lighting fixtures that are configured to receive Edison-style bases. LED-based luminaires are much more complex than incandescent luminaires, which are essentially formed of a filament housed in a gas-filled globe. LED-based luminaires not only include LEDs for emitting light, but also employ relatively sophisticated power supplies and control circuitry to drive the LEDs with special drive signals. As a result, typical dimmers often have various compatibility issues when used with LED-based luminaires. Accordingly, there is a need for a cost effective dimmer that works well with LED-based luminaires.

SUMMARY

For one embodiment, a pulse width modulated (PWM) dimmer is disclosed. The PWM dimmer includes a source terminal, a load terminal, a power stage, an interface, and control circuitry. The power stage is coupled between the source terminal and the load terminal and is configured to receive from the source terminal an AC supply signal and provide a pulsed AC load signal to the load terminal in response to a control signal. The AC supply signal has a sinusoidal envelope with a positive half-cycle and a negative half-cycle for each cycle. The pulsed AC load signal tracks the envelope and includes a plurality of pulses in each of the positive half-cycle and the negative half-cycle for each cycle. The interface is configured to receive dimming control information bearing on a dimming level from a user or remote terminal. The control circuitry is configured to receive the dimming control information from the interface and generate the control signal based on the dimming control information. When driven by the control signal, the power stage will provide the pulsed AC load signal such that an RMS (root mean square) value of the pulsed AC load signal corresponds with the desired dimming level and varies as the dimming level varies corresponding to the desired dimming level. When the pulsed AC load signal is provided to one or more LED-based luminaires, the LED-based luminaires will emit light at the desired dimming level. The use of a pulsed AC load signal, instead of a phase cut load signal, as described further below, avoids the compatibility issues inherent in traditional leading and trailing edge based dimmers.

In certain embodiments, the duty cycle of the AC load signal varies as the dimming level varies, and the control signal is a PWM signal that corresponds with the pulsed AC load signal. In other embodiments, when the AC supply signal is at a magnitude less than a defined threshold, the pulsed AC load signal corresponds directly with the AC supply signal.

The interface may include a user input interface, a wireless communication interface, or a combination thereof. The user input interface may include at least one of a mechanical switch, a mechanical rotary dial, and a mechanical slider for receiving the human input related to dimming level, on state, off state, CCT values, and other lighting parameters. The user input interface may also be implemented as touch screen or capacitive touch interface for receiving the human input.

The wireless communication interface may be configured to wirelessly receive information indicative of the dimming level and transmitted from a terminal device and provide the dimming control information bearing on the dimming level to the control circuitry. The physical user input interface may be configured to directly receive human input indicative of the dimming level and provide the dimming control information bearing on the dimming level to the control circuitry. The control circuitry will control the power stage based on the dimming control information received from either or both of the wireless communication interface and the user input interface.

If both a physical user input interface and a communication interface are provided in the PWM dimmer, the communication interface may be configured to transmit fixture control information indicative of the dimming level and intended for at least one remote luminaire. In a first mode, the control circuitry causes the power stage to provide the pulsed AC load signal to the load terminal, such that the RMS value of the pulsed AC load signal corresponds with the desired dimming level and varies as the dimming level varies corresponding to the desired dimming level. In a second mode, the control circuitry causes the power stage to pass the AC supply signal substantially unaltered to the load terminal and causes the communication interface to transmit the fixture control information indicative of the dimming level to the at least one remote luminaire, wherein the at least one remote luminaire outputs light at the dimming level.

In yet another embodiment, the user input interface is further configured to directly receive human input indicative of a CCT and provide color control information bearing on the CCT to the control circuitry. In the second mode, which is referenced above, the control circuitry causes the communication interface to transmit fixture control information indicative of the CCT to the at least one remote luminaire, wherein the at least one remote luminaire outputs light at the CCT. Any other lighting parameter may be controlled in a similar fashion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, the inventive concepts are described in examples that employ dimmers and LED-based luminaires, such as bulb type luminaires that mimic the look and function of traditional incandescent light bulbs. These dimmers represent wall controllers, and the LED-based luminaires represent LED-based luminaires of various types. The concepts disclosed herein are not limited to bulb-type luminaires or wall controllers of any particular type.

A pulse width modulated (PWM) dimmer is described in detail below. In one embodiment, the PWM dimmer includes a source terminal, a load terminal, a power stage, an interface, and control circuitry. The power stage is coupled between the source terminal and the load terminal and is configured to receive from the source terminal an AC supply signal and provide a pulsed AC load signal to the load terminal in response to a control signal. The AC supply signal has a sinusoidal envelope with a positive half-cycle and a negative half-cycle for each cycle. The pulsed AC load signal tracks the envelope and includes a plurality of pulses in each of the positive half-cycle and the negative half-cycle for each cycle.

The interface is configured to receive dimming control information bearing on a dimming level from a user or remote terminal. The control circuitry is configured to receive the dimming control information from the interface and generate the control signal based on the dimming control information. When driven by the control signal, the power stage will provide the pulsed AC load signal such that an RMS (root mean square) value of the pulsed AC load signal corresponds with the desired dimming level and varies as the dimming level varies corresponding to the desired dimming level. When the pulsed AC load signal is provided to one or more LED-based luminaires, the LED-based luminaires will emit light at the desired dimming level based on the RMS value of the pulsed AC load signal. The use of a pulsed AC load signal, instead of a phase cut load signal, as described further below, avoids significant compatibility issues that are inherent in traditional leading and trailing edge based dimmers.

Figure 1B:
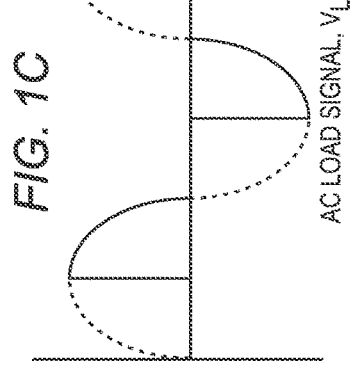
FIG. 1B illustrates an AC supply signal, $V_S$.
Figure 1C:
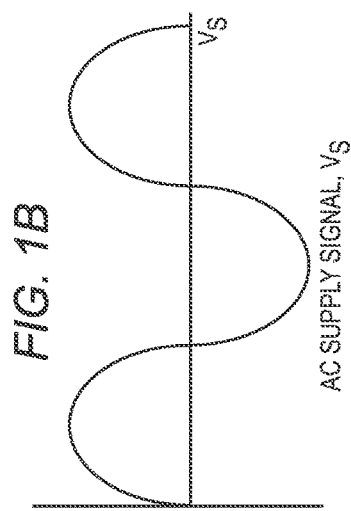
FIG. 1C illustrates an AC load signal, $V_L$, for the leading edge dimmer.
Figure 1A:
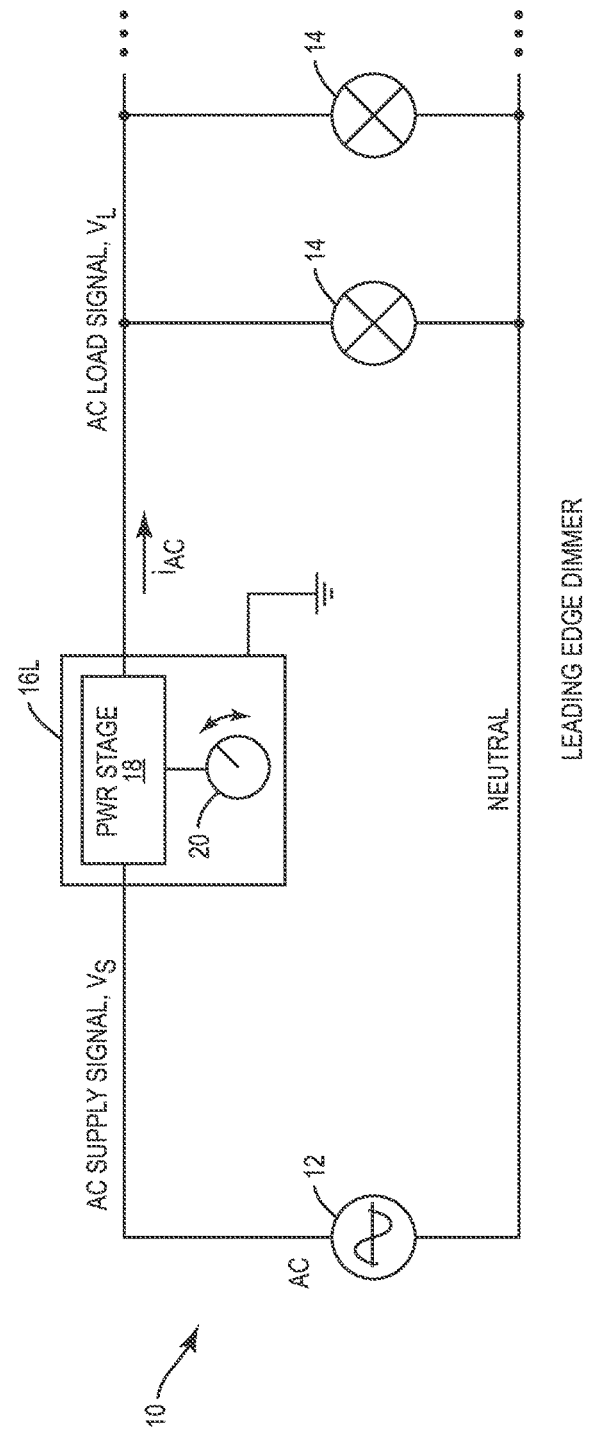
FIG. 1A is a schematic of the lighting circuit featuring LED-based luminaires and a leading-edge dimmer, according to the related art.

Prior to delving into the details of the disclosed embodiments, an overview of some typical lighting circuits is provided along with an explanation of why existing leading and trailing edge dimmers are incompatible with LED-based luminaires. A typical lighting circuit 10 is illustrated in FIG. 1A. The lighting circuit 10 includes an AC source 12, one or more LED-based luminaires 14, and a TRIAC-based, leading-edge dimmer 16L. The LED-based luminaires 14 are placed in parallel with one another, and the leading-edge dimmer 16L is placed in series between the AC source 12 and the LED-based luminaires 14. The leading-edge dimmer 16L may be tied to an earth ground. The return current path from LED-based luminaires 14 to the AC source 12 is typically referred to as a neutral.

The LED-based luminaires 14 are typically configured to output light at an intensity level proportional to the root mean square (RMS) value of the signal used to provide power to the LED-based luminaires 14. In essence, the signal providing power to the LED-based luminaires 14 is used to both power the LED-based luminaires 14 and indicate a relative dimming level. The internal electronics of the LED-based luminaires 14 are configured to receive power from the signal as well as derive a dimming level based on the nature of the signal. A full sinusoidal signal will result in the LED-based luminaires 14 outputting light at a maximum intensity level, no signal will result in the LED-based luminaires 14 being turned completely off, and a partial sinusoidal signal will result in the LED-based luminaires 14 outputting light at an intensity level that is relatively proportional to the RMS value of the partial sinusoidal signal.

The leading-edge dimmer 16L has a power stage 18, which includes a TRIAC that functions to cut a portion of the leading edges of the positive and negative half-cycles of the sinusoidal AC supply signal $V_S$ to provide, what is generally referred to as a phase-cut AC load signal $V_L$. The AC supply signal $V_S$ is illustrated in FIG. 1B, while the phase-cut AC load signal $V_L$ is illustrated in FIG. 1C. As illustrated in FIG. 1C, the first half of both of the positive and negative half-cycles has been cut. A 50% cut generally corresponds to a 50% dimming setting. The 50% dimming value shown in FIG. 1C is merely exemplary. Cutting portions of the half-cycles changes the RMS voltage of the phase-cut load signal $V_L$. The amount of the phase cut is selected through a dimming interface 20, which controls the power stage 18, and can vary anywhere between 0% and 100%. The amount of the phase cut generally corresponds directly with the dimming level.

Figure 2:
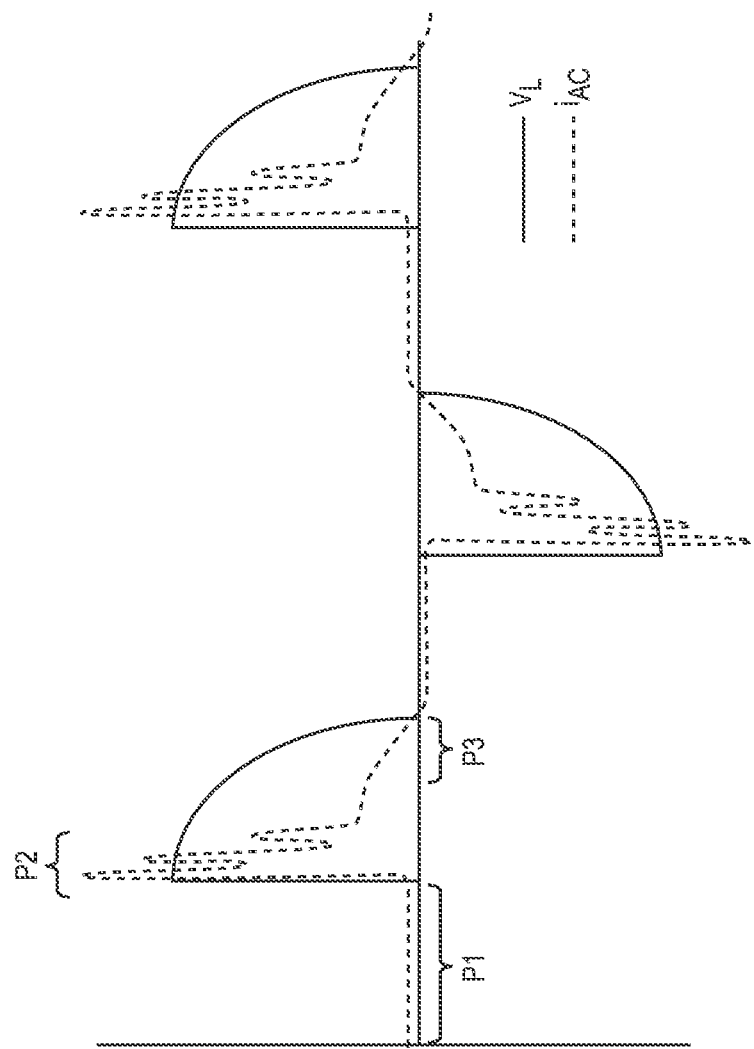
FIG. 2 illustrates a phase-cut, AC load signal, $V_L$, juxtaposed with an AC load current, $i_{AC}$.

The compatibility issues mentioned above are a result of driving the LED-based bulbs with the phase-cut load signal $V_L$. The compatibility issues break down into three types: flicker, audible noise, and shimmer. With reference to FIG. 2, the phase-cut load signal $V_L$ is shown juxtaposed with a typical load current, $i_{AC}$. During the period P1, where the half-cycle is cut, the phase-cut AC load signal $V_L$ is not delivering power to the LED-based luminaires 14. For the LED-based luminaires 14 to remain operational, their power supplies must have sufficiently large capacitors to store enough energy for the LED-based luminaires 14 to operate. At lower dimming levels, or when the extent of the phase cut is large, the LED-based labels 14 may run out of stored energy during the period P1. When the energy is depleted, the power supplies and control circuitry of the LED-based luminaires 14 will shut down, and thus, no light will be emitted from the LED-based luminaires 14. When the active (uncut) portions of the half-cycles occur, the phase-cut AC load signal $V_L$ resumes delivering power to the LED-based luminaires 14, and thus, the LED-based luminaires 14 will resume emitting light. With 50 or 60 Hertz AC source signals $V_S$, this process will repeat for each cycle or half-cycle, depending on the design of the LED-based luminaires 14, to cause a visible flicker of the light being emitted from the LED-based luminaires 14. While increasing the capacitance of the power supplies in the LED-based luminaires 14 may reduce flicker, increasing such capacitance increases the price of the LED-based luminaires 14 and takes up precious real estate within the LED-based luminaires 14.

During period P2, which corresponds to the period just after the phase-cut AC load signal $V_L$ transitions from being cut to being uncut, the load current $i_{AC}$ spikes. This inrush of the load current $i_{AC}$ can overload and resonate with the electronics of the LED-based luminaires 14 and cause an audible hum, which may change in amplitude and pitch based on the dimming level.

During period P3, the phase-cut AC load signal $V_1$ rapidly decreases to zero, and as a result, the load current $i_{AC}$ also decreases to zero. As these signals decrease during period P3, the power supplies and control electronics of the LED-based luminaires 14 lose stability and may cause the emitted light to fluctuate or modulate in a perceptible fashion. These fluctuations occur at a much slower rate than the flicker that was described above and make the light emitted from the LED-based luminaires 14 seemed unstable, especially at lower dimming levels.

Figure 3B:
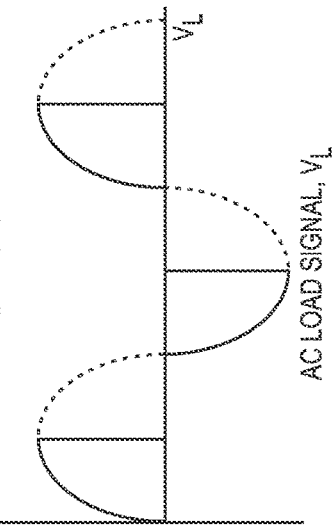
FIG. 3B illustrates an AC supply signal, $V_S$.
Figure 3C:
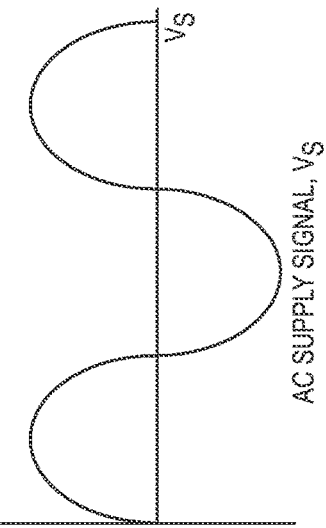
FIG. 3C illustrates an AC load signal, $V_L$, for the trailing-edge dimmer.
Figure 3A:
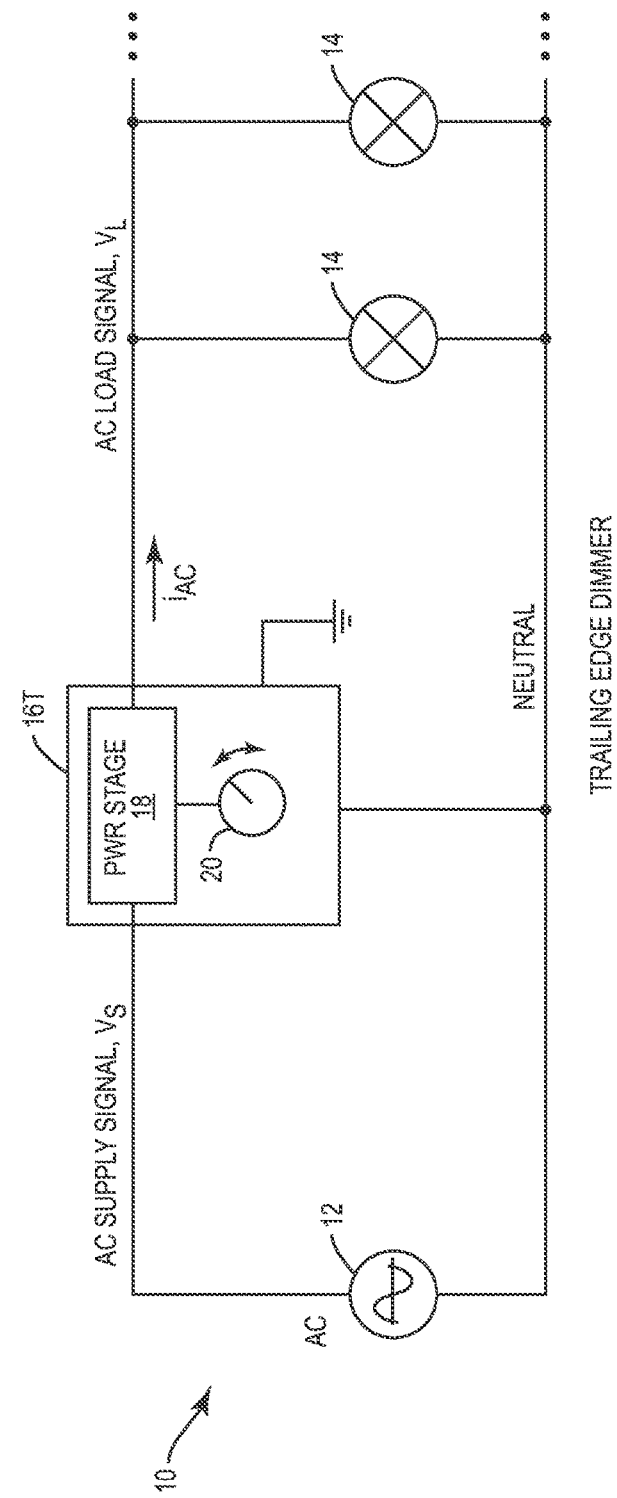
FIG. 3A is a schematic of the lighting circuit featuring LED-based luminaires and a trailing-edge dimmer, according to the related art.

Another common phase-cut dimmer is a trailing-edge dimmer 16T, as shown in FIG. 3A. Instead of cutting the leading edges of the positive and negative half-cycles of the AC supply signal, $V_S$ (FIG. 3B), the trailing edges of the positive and negative half-cycles of the AC supply signal, $V_S$, are cut based on the selected dimming level (FIG. 3C). The trailing-edge dimmer 16T is typically based on a field effect transistor (FET) and requires a fourth connection to neutral. Although more expensive and complicated than leading-edge dimmers 16L, trailing-edge dimmers 16T also suffer from many of the same issues as the leading-edge dimmers 16L. Any one of flicker, audible noise, and shimmer detracts from the user experience, but in most instances, all three present themselves to different degrees at different dimming levels when phase-cut style dimmers are used with LED-based luminaires 14.

Figure 4:
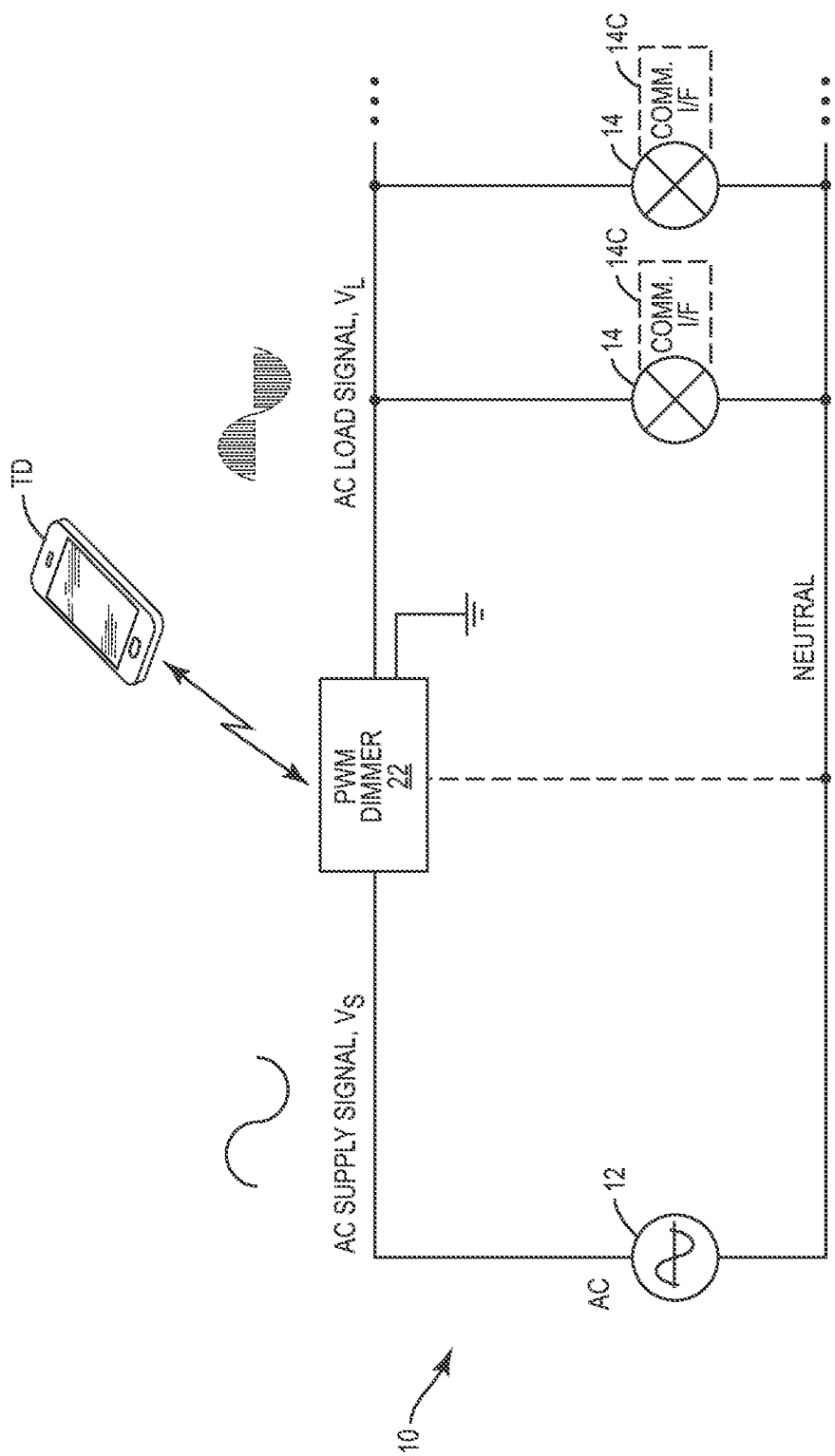
FIG. 4 is a schematic of a lighting circuit featuring LED-based luminaires and a pulse width modulated (PWM) dimmer.

In FIG. 4, a PWM dimmer 22 is illustrated in a typical lighting circuit 10. As noted above, the lighting circuit 10 includes an AC source 12, one or more LED-based luminaires 14, and the PWM dimmer 22. The LED-based luminaires 14 are placed in parallel with one another, and the PWM dimmer 22 is placed in series with the AC source 12 and the LED-based luminaires 14. The return current path from LED-based luminaires 14 to the AC source 12 is via a neutral path. The PWM dimmer 22 may also be tied to an earth ground and/or neutral.

Figure 5:
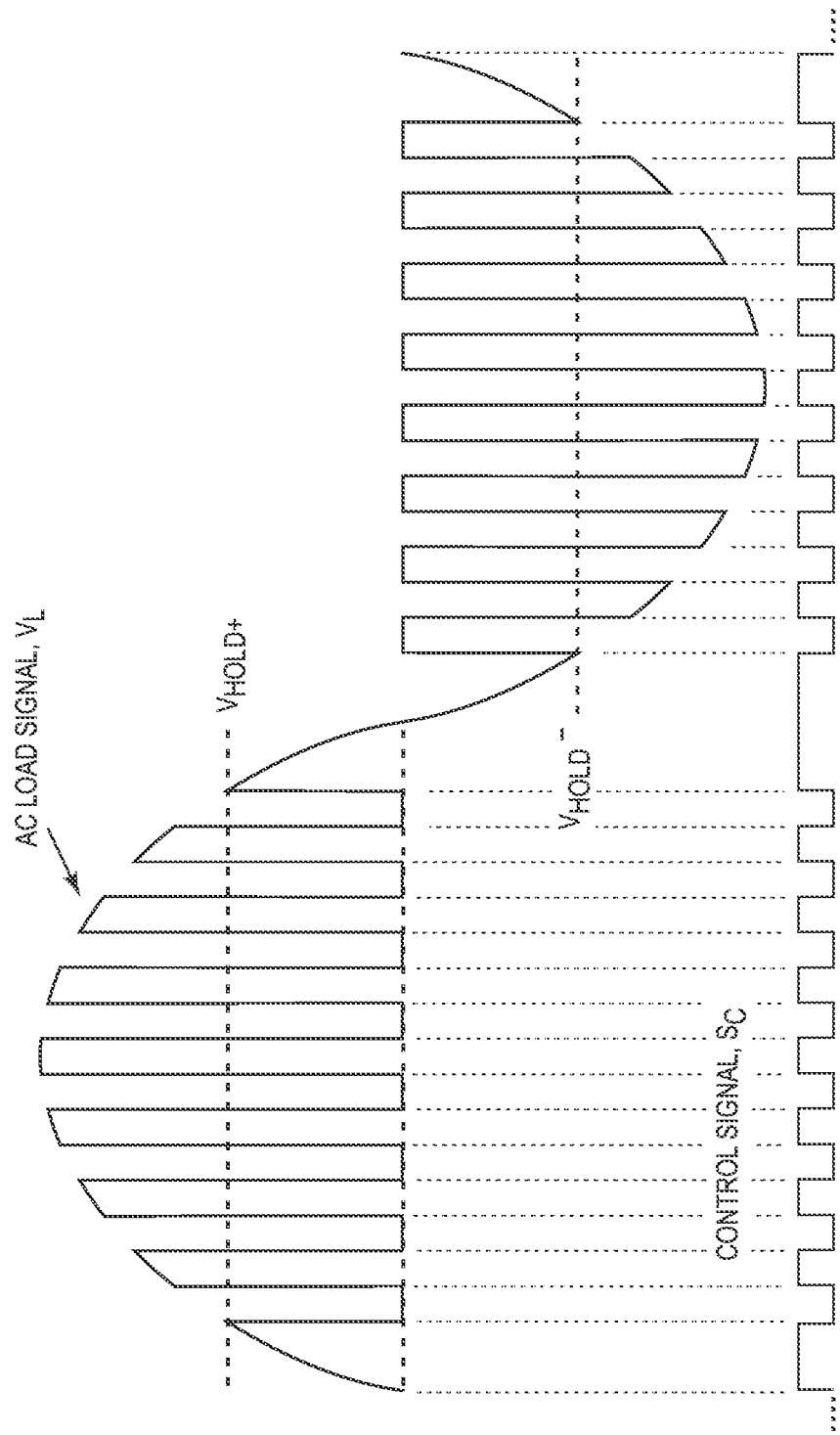
FIG. 5 illustrates an AC load signal, $V_L$, and an associated control signal, SC, for the PWM dimmer.

Unlike the leading-edge dimmer 16L or the trailing-edge dimmer 16T, which function to cut either leading or trailing edges of the half-cycles of the sinusoidal AC supply signal $V_S$ to provide a phase-cut AC load signal $V_L$, the PWM dimmer 22 functions to provide a pulsed AC load signal $V_L$, at least when dimming is employed. An exemplary pulsed AC load signal $V_L$ is illustrated in FIG. 5, along with a control signal, $S_C$. Prior to describing the details of the pulsed AC load signal $V_L$, an overview of the electronics of the PWM dimmer 22 is described in association with FIG. 6.

As illustrated, a power stage 24 is coupled between a source terminal $T_S$ and a load terminal $T_L$. The source terminal $T_S$ is configured to receive the AC supply signal $V_S$, and the pulsed AC load signal $V_L$ will be provided at the load terminal $T_L$. The power stage 24 can include various types of switching circuitry, such as any combination of transistors, TRIACs, relays, and the like, and is configured to process the AC supply signal $V_S$ to generate the pulsed AC load signal $V_L$ in response to a control signal $S_C$, which is provided by a control circuitry 26. The control circuitry 26 is associated with memory 28, which will store the program instructions necessary for the control circuitry 26 to provide the functionality described herein.

In a first mode, an input interface (I/P I/F) 30 is associated with the control circuitry 26 and provides a mechanism for a user to manually select one or more of an on state, an off state, a dimming level, a CCT, or other lighting parameter via one or more buttons, keypads, toggle switches, rocker switches, mechanical sliders, capacitive touch interfaces, touchscreens, and the like. For the current embodiment, assume the input interface 30 provides a mechanism for selecting an on state, an off state, and a desired dimming level. The on/off state and dimming level is passed from the input interface 30 to the control circuitry 26 via an input signal $S_I$.

The control circuitry 26, based on the on/off state dimming level, will generate a corresponding control signal $S_C$ to drive the power stage 24. If the input signal $S_I$ is indicative of an off state, the control circuitry 26 will generate a control signal $S_C$ to cause the power stage 24 to turn off, and thus, prevent any portion of the AC source signal $V_S$ from being presented to the load terminal $T_L$. In this state, no signal is provided to the LED-based luminaires 14. If the input signal $S_I$ is indicative of an on state without any dimming, or in other words, maximum light output is desired, the control circuitry 26 will generate a control signal $S_C$ to cause the power stage 24 to pass the AC supply signal $V_S$ to the load terminal $T_L$. As such, the AC load signal $V_L$ is essentially the unaltered, fully sinusoidal, AC supply signal $V_S$, without any phase cuts or pulses, and is passed to the LED-based luminaires 14.

If the input signal $S_I$ is indicative of an on state with a selected dimming level, the control circuitry 26 will generate a control signal $S_C$ to cause the power stage 24 to generate a pulsed AC load signal $V_L$, which is configured to cause the LED-based luminaires 14 to output light at an intensity level corresponding to the selected dimming level. In particular, the pulsed AC load signal $V_L$ will have an RMS value corresponding to the selected dimming level. As the selected dimming level varies, the RMS value of the pulsed AC load signal $V_L$ will vary.

One way to vary the RMS value of the pulsed AC load signal $V_L$ is to employ pulse width modulation and vary the duty cycle of the control signal $S_C$ based on the selected dimming level. The higher the dimming level, the higher the duty cycle, and vice versa. Returning now to FIG. 5, a control signal $S_C$ is shown juxtaposed with a pulsed AC load signal $V_L$. For clarity, the duty cycle for most of the control signal $S_C$, and thus the pulsed AC load signal $V_L$, is approximately 50%, which will correspond to a dimming level of roughly 50%. As the duty cycle increases, the dimming level increases, and vice versa. Notably, the AC supply signal $V_S$ (not shown) has a sinusoidal shape, which is referred to as an envelope. The individual pulses of the pulsed AC load signal $V_L$ are spaced apart and track the envelope of the AC supply signal $V_S$ through the positive and negative half-cycles of the AC supply signal $V_S$. The number of pulses occurring during each half-cycle will be at least two and generally depend on the period of the control signal $S_C$ and how zero crossings are handled. The period and/or the duty cycle of the control signal $S_C$ and/or the AC load signal $V_L$ may vary within each half-cycle, from one half-cycle to another, or based on the dimming level.

To limit the amount of time where the AC load signal $V_L$ is at or near zero, especially around zero crossings, a hold threshold may be established. As illustrated in FIG. 5, hold thresholds of $V_{HOLD+}$ for the positive half-cycle and $V_{HOLD-}$ for the negative half-cycle are defined. These thresholds are used to prevent pulsing of the pulsed AC load signal $V_L$ when the AC supply signal $V_S$ is below the $V_{HOLD+}$ threshold during the positive half-cycle and below the $V_{HOLD-}$ threshold (in magnitude) during the negative half-cycle. One can see that the control signal $S_C$ stays active (high, as illustrated) on both sides of the zero crossing during the period where the envelope of the AC supply signal $V_S$ is below $V_{HOLD+}$ and $V_{HOLD-}$, and as such, the AC load signal $V_L$ directly tracks the AC supply signal $V_S$ and is not pulsed during this period. Those skilled in the art will recognize that the particular configuration of the power stage 24 may dictate the need for different configurations of the control signal $S_C$. Regardless of these configurations, using a pulsed AC load signal $V_L$ that has multiple pulse width modulated pulses that are spread throughout each half cycle has proven to reduce, if not completely eliminate, the flicker, shimmer, and audible noise caused by leading and trailing edge, phase cut dimmers.

With reference again to FIG. 6, the PWM dimmer 22 may also include an output interface (O/P I/F) 32, which is configured to provide audible or visual information to a user. The information may be indicative of the state or setting of the PWM dimmer 22 or an associated LED-based luminaire 14. The output interface 32 may range from an LED to an alpha-numeric display to a high-resolution, graphics display, which is associated with a speaker, and the requisite electronics to drive them. The input interface 30 and the output interface 32 may be separate or highly integrated, as in the case of a touchscreen display. The control circuitry 26 will receive information from the user input interface 30 via one or more input signals $S_I$ and provide information to the output interface 32 via one or more output signals $S_O$.

The PWM dimmer 22 may also include a communication interface 34, which may support wired or wireless communications according to any number of protocols and standards, including Bluetooth, IEEE 802.11, cellular, and NFC (near field communication) protocols and standards. The communication interface 34 is associated with the control circuitry 26 and may facilitate bidirectional communications with any number of devices, including terminal devices TD, which may take the form of mobile phones (as shown in FIG. 4), computers, mobile phones, tablets, configuration tools, and the like. States and dimming level information for the PWM dimmer 22 may be transmitted from the terminal device TD to the communication interface 34, which will pass the state and/or dimming level information to the control circuitry 26 for processing. The control circuitry 26 can then control the power stage 24 based on the information received from the terminal device TD via the communication interface 34. The control circuitry 26 may also receive data, software, and firmware updates from the terminal device TD via the communication interface 34. The control circuitry 26 may also send information to the terminal device TD via the communication interface 34. The information sent to the terminal device TD may range from state information to diagnostic information of the PWM dimmer 22.

The communication interface 34 may also be configured to communicate with LED-based luminaires 14, which are equipped with a compatible communication interface 14C, as illustrated in FIG. 4. Being able to communicate with compatible LED-based luminaires 14 dramatically increases the functionality and flexibility of the PWM dimmer 22. For example, the PWM dimmer 22 may be configured to operate in different modes depending on the capabilities of the LED-based luminaires 14. The following provides an exemplary scenario wherein the PWM dimmer 22 operates in two modes.

In a first mode, assume that the LED-based luminaires 14 are configured without a communication interface 14C. In this mode, the control circuitry 26 operates as described above. When the desired dimming level is between 0% and 100%, the control circuitry 26 is configured to cause the power stage 24 to provide the pulsed AC load signal $V_L$ to the load terminal $T_L$ based on the desired dimming level, which was provided by the user input interface 30 or the terminal device TD via the communication interface 34. In essence, the duty cycle of the pulses of the pulsed AC load signal $V_L$ are controlled such that the RMS value of the pulsed AC load signal $V_L$ corresponds to the desired dimming level. The RMS value of the pulsed AC load signal $V_L$ will vary as the desired dimming level varies and will correspond to the desired dimming level.

If the off state is selected, the control circuitry 26 will turn off the power stage 24 such that no signal is provided to the load terminal $T_L$, and as such, no power is sent to the LED-based luminaires 14. If the on state is selected, the control circuitry 26 will control the power stage 24 such that the AC supply signal Vs is passed to the load terminal $T_L$, and as such, the full AC supply signal $V_S$ is provided to the LED-based luminaires 14.

If the LED-based luminaires 14 are equipped with the communication interface 14C and are capable of communicating with the PWM dimmer 22, the control circuitry 26 may operate in a second mode. In the second mode, the control circuitry 26 causes the power stage 24 to pass the AC supply signal $V_S$ substantially unaltered to the load terminal $T_L$ and uses the communication interface 34 to transmit fixture control information to the associated LED-based luminaires 14. The fixture control information will indicate whether the LED-based luminaires 14 should be in an on state or an off state, and if the LED-based luminaires 14 should be in an on state, the desired dimming level. As such, the LED-based luminaires 14 will receive an unaltered AC supply signal $V_S$ regardless of the desired dimming level. The unaltered AC supply signal $V_S$ is used for powering the LED-based luminaires 14; however, the internal control circuitry of the LED-based luminaires 14 will use the fixture control information, which was transmitted from the PWM dimmer 22, to determine the relative dimming level for the light emitted from the LED-based luminaires 14.

If an off state is desired, the control circuitry 26 may either cause the power stage 24 to stop passing the AC supply signal $V_S$ to the LED-based luminaires 14 or transmit fixture control information, which indicates an off state has been selected, to the LED-based luminaires 14 via the communication interface 34. In the former case, no power is provided to the LED-based luminaires 14 during the off state, and as such, the LED-luminaires 14 are simply powered down. In the latter case, the AC supply signal $V_S$ is continuously provided to the LED-based luminaires 14, regardless of whether they are in an off state, in an on state, or at any dimming level. The control circuitry 26 will control the power stage 24 based on the fixture control information received from the PWM dimmer 22.

When the PWM dimmer 22 is equipped with the communication interface 34 and configured to provide fixture control information to the LED-based luminaires 14, lighting characteristics other than on state, off state, and dimming level may be controlled. For example, a user may be able to select a desired correlated color temperature (CCT) via the input interface 30 or the terminal device TD. In the latter instance, the user may select a desired CCT in an application running on the terminal device TD, which will transmit information indicative of the selected CCT to the control circuitry 26 of the PWM dimmer 22 via the communication interface 34. Whether input through the input interface 30 or received via the communication interface 34, the control circuitry 26 may transmit the selected CCT in the fixture control information to the LED-based luminaires 14. In response to receiving the selected CCT, the LED-based luminaires 14 will adjust the color temperature of the emitted light to the selected CCT.

Notably, adjustment of the CCT in this manner may be provided in either of the two modes, which were discussed above. In the first mode, the PWM dimmer 22 may function to provide the pulsed AC load signal $V_L$ according to a selected dimming level as well as use the communication interface 34 to transmit the selected CCT to the LED-based luminaires 14. The LED-based luminaires 14 will select a dimming level for the emitted light based on the pulsed AC load signal $V_L$ and the CCT for the emitted light based on the fixture control information transmitted from the communication interface 34 of the PWM dimmer 22. In the second mode, the dimming level and the selected CCT are both transmitted to the LED-based luminaires 14 in the fixture control information. Again, the fixture control information may be transmitted wirelessly or via a wire that is separate from the wire in which the AC load signal $V_L$ is provided to the LED-based luminaires 14. In one embodiment, the fixture control information may be modulated and transmitted on the same wire in which the AC load signal $V_L$ is provided to the LED-based luminaires 14.

The fixture control information is not limited to on states, off states, dimming levels, and CCTs. Other lighting characteristics associated with the light emitted from the LED-based luminaires 14 may be controlled in the same manner as the CCTs are controlled. Further, the PWM dimmer 22 may be configured to interact with different groups of LED-based luminaires 14 and independently control each of these groups individually or in combination. For example, a user may be able to select a particular group or subset of groups via the PWM dimmer 22, via the user input interface 30 or the terminal device TD, and control the LED-based luminaires 14 of the selected group(s) in a dynamic fashion or select preprogrammed scenes. A scene dictates the lighting characteristics of the LED-based luminaires 14 among multiple groups. When a particular scene is selected, a first group of LED-based luminaires 14 are set to provide light at a first dimming level and a first CCT, and a second group of LED-based luminaires 14 are set to provide light at a second dimming level and a second CCT.

The PWM dimmer 22 may also include one or more sensors 36, such as an occupancy sensor, an ambient light sensor, a vibration sensor, a heat sensor, a smoke sensor, and the like. The sensors 36 may also provide signals, such as the sensor signal $S_S$, to the control circuitry 26. The control circuitry 26 may control the power stage 24 based on the sensor signal $S_S$ as well as transmit fixture control information to the LED-based luminaires 14 based thereon. In essence, the control circuitry 26 may control the LED-based luminaires 14 based on one or any combination of user input received at the input interface 30, information transmitted to the PWM dimmer 22 via the communication interface 34, and sensor information received from the sensors 36. Notably, sensors that are remote to the PWM dimmer 22 may be provided and configured to pass sensor information to the PWM dimmer 22 via the communication interface 34. These sensors may be remotely located throughout an associated environment as standalone devices or integrated into other devices, such as the LED-based luminaries 14. Those skilled in the art will appreciate the flexibility provided by the PWM dimmer 22 upon understanding information disclosed herein.

Figure 6:
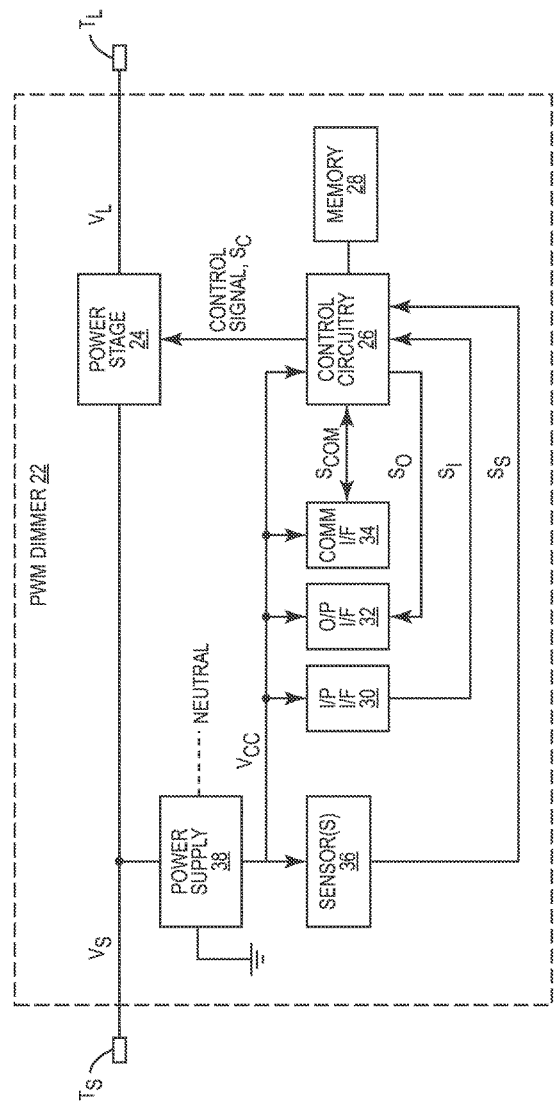
FIG. 6 is a schematic of an exemplary PWM dimmer.

With continuing reference to FIG. 6, the PWM dimmer 22 includes a power supply 38 that is coupled to the source terminal $T_S$. The power supply 38 will rectify and regulate the AC supply signal $V_S$ to provide a DC supply signal, which is generally referenced as the $V_{CC}$. The DC supply signal, $V_{CC}$, may provide DC power to at least to the control circuitry 26, the input interface 30, the output interface 32, the communication interface 34, the sensors 36, and any other electronics within the PWM dimmer 22 that require such power. Any voltage references, current sources, and the like may also be derived from the power supply 38 and provided to any of the electronics of the PWM dimmer 22, including the power stage 24.

Figure 7A:
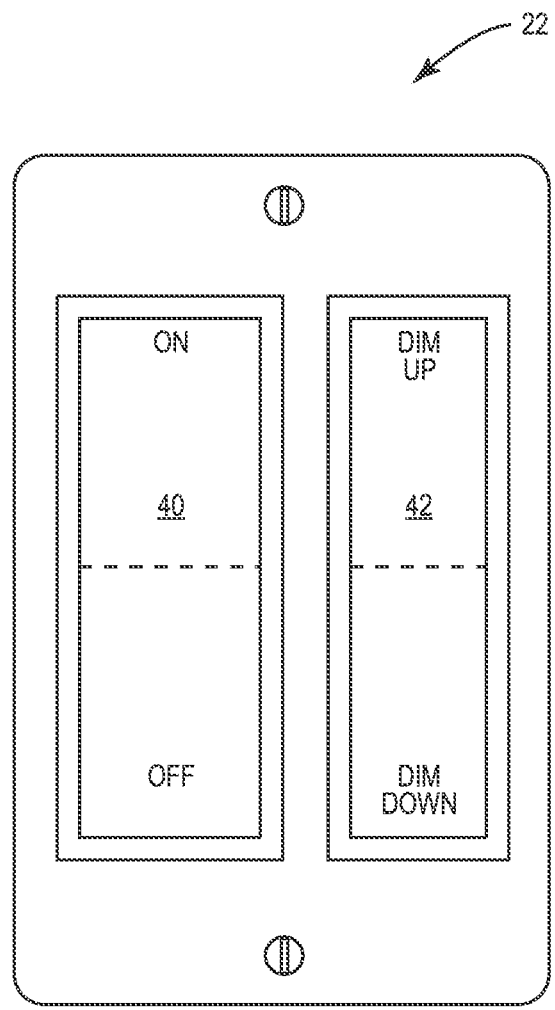
FIGS. 7A and 7B are plan and isometric views of a PWM dimmer, according to a first embodiment.
Figure 7B:
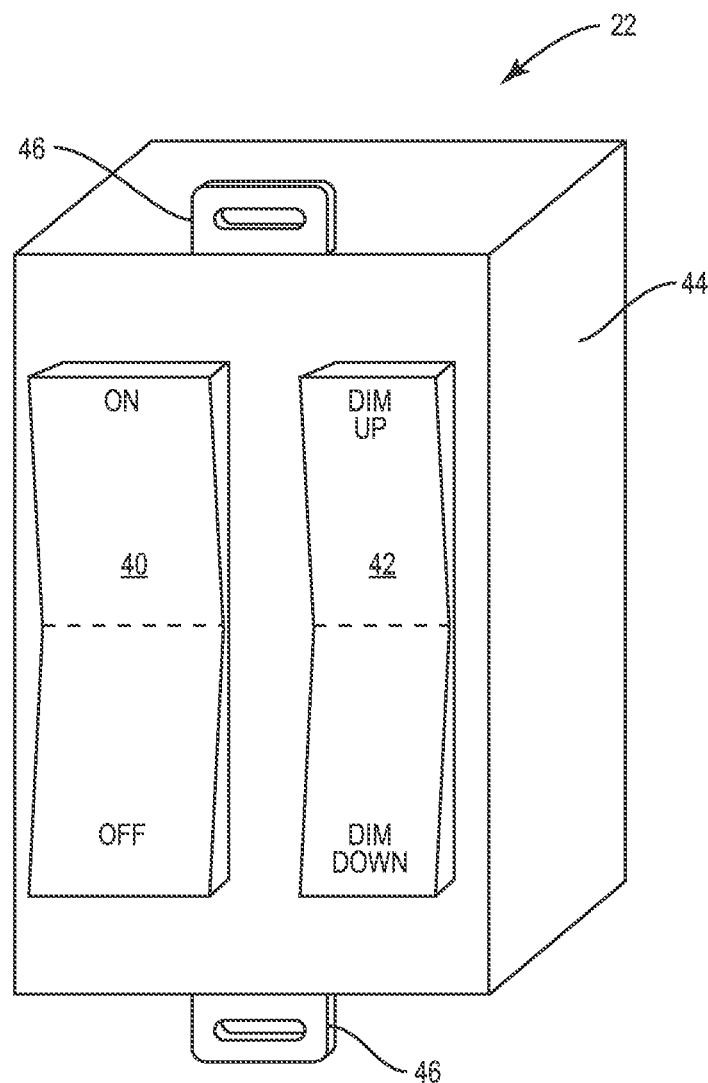

With reference to FIGS. 7A and 7B, an exemplary PWM dimmer 22 is illustrated. The PWM dimmer 22 is shown in this embodiment with two buttons: an on-off button 40 and a dimming button 42, which together form the user input interface 30. Pressing the upper half of the on-off button 40 will cause the PWM dimmer 22 to place the associated LED-based luminaires 14 in an on state. Pressing the lower half of the on-off button 40 will cause the PWM dimmer 22 to place the associated LED-based luminaires 14 in an off state. Pressing the upper and lower half of the dimming button 42 will cause the PWM dimmer 22 to increase or decrease the dimming level of the associated LED-based luminaires 14. With particular reference to FIG. 7B, the PWM dimmer 22 may include a housing 44 on which the on-off button 40 and the dimming button 42 are mounted and in which electronics associated with the PWM dimmer 22 are enclosed. While not illustrated, the supply terminal $T_S$, the load terminal $T_L$, a ground terminal, and perhaps a neutral terminal, may be implemented as wiring terminals mounted on the housing 44 or wires projecting out of the housing 44.

The PWM dimmer 22 may also have a pair of mounting tabs 46, which extend from both the top and bottom of the housing 44. In a typical residential or commercial installation, the housing 44 is physically configured to be received by a wall-mounted, electrical junction box (not shown), and the mounting tabs 46 have openings that align with respective mounting holes in the junction box in traditional fashion. Bolts will extend through the openings in the mounting tabs 46 and threaded into the mounting holes of the junction box to securely attach the PWM dimmer 22 within and to the electrical junction box.

Figure 8:
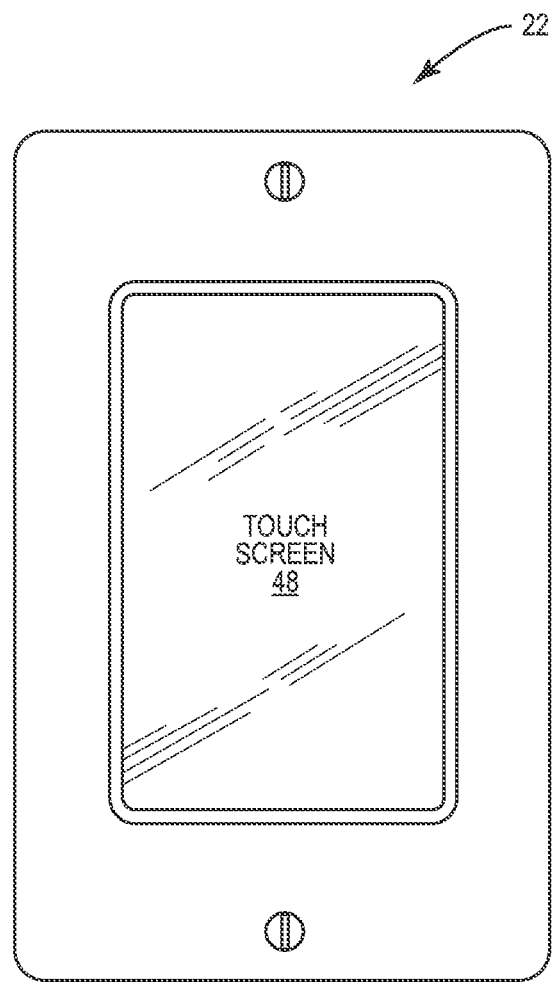
FIG. 8 is a plan view of a PWM dimmer, according to a second embodiment.

FIG. 8 illustrates a PWM dimmer 22 wherein the input interface 30 and the output interface 32 are provided by a touchscreen interface 48.

Figure 9:
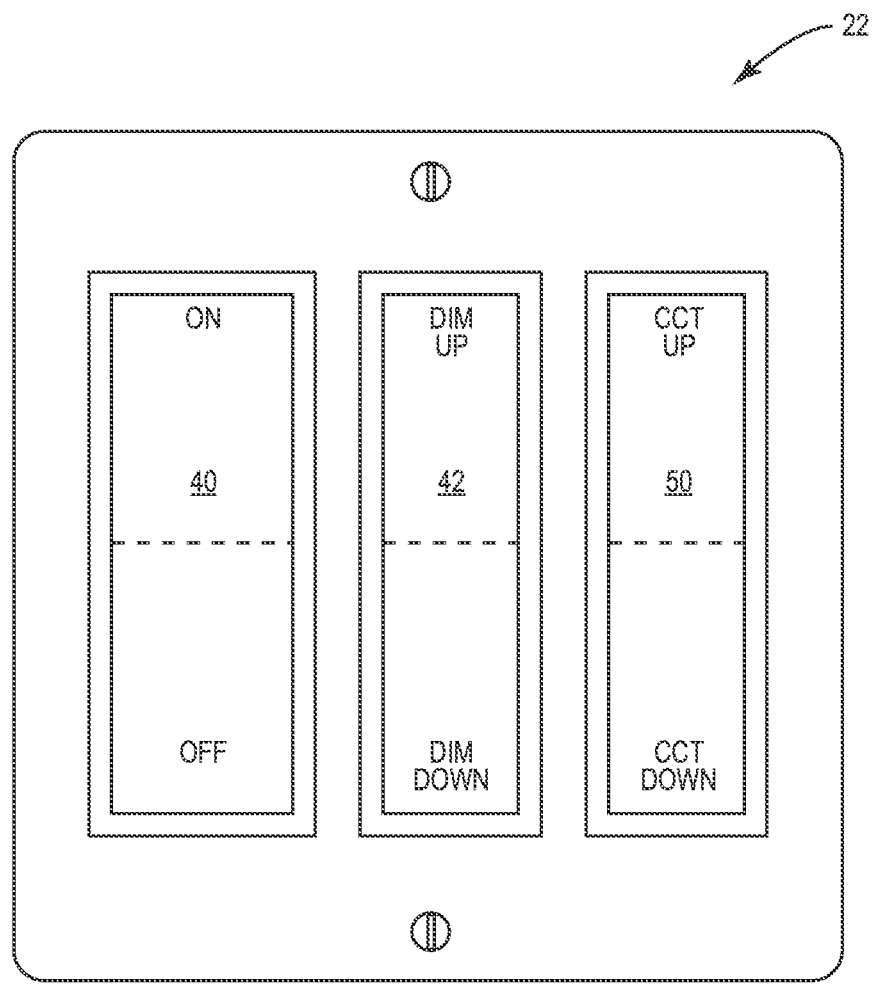
FIG. 9 is a plan view of a PWM dimmer, according to a third embodiment.

With reference to FIG. 9, a variation of the PWM dimmer 22 in FIG. 7A is illustrated. The PWM dimmer 22 is shown in this embodiment with three buttons instead of two: an on-off button 40, a dimming button 42, and a CCT button 50. Pressing the upper and lower half of the dimming button 42 will cause the PWM dimmer 22 to increase or decrease the dimming level of the associated LED-based luminaires 14.

Figure 10:
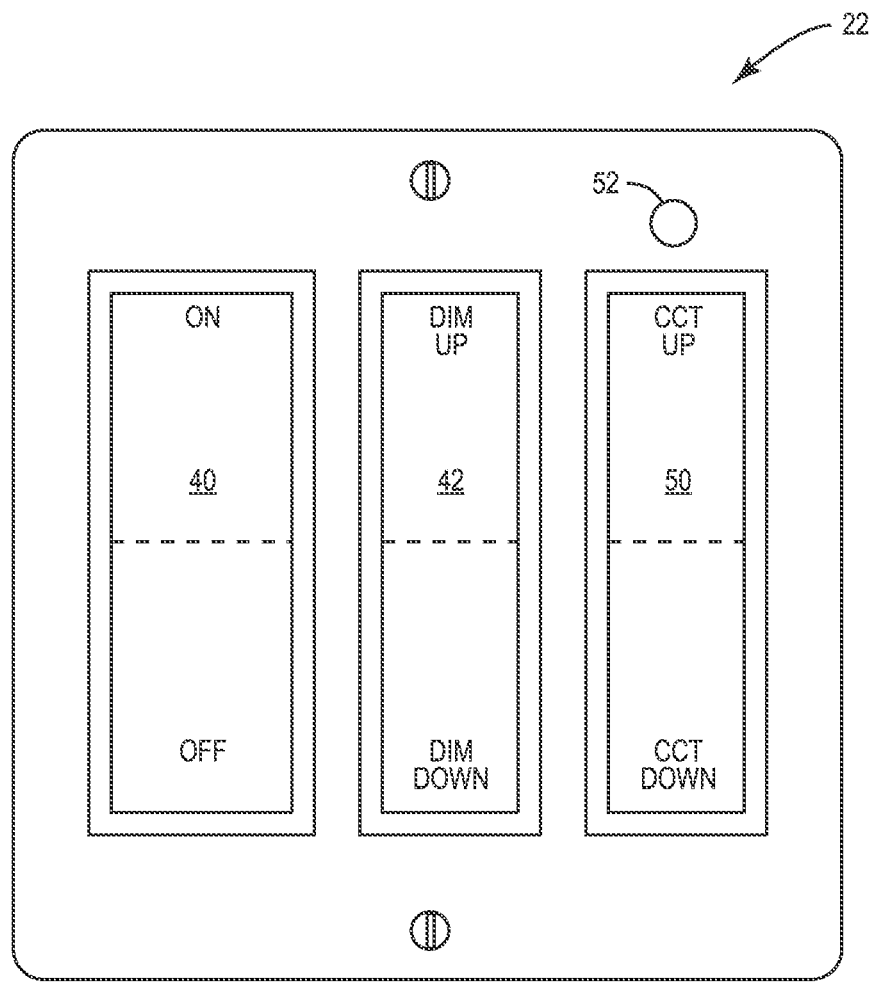
FIG. 10 is a plan view of a PWM dimmer, according to a fourth embodiment.

A variation of the PWM dimmer 22 of FIG. 9 is shown in FIG. 10. In this embodiment, a first CCT LED 52 is provided directly above the CCT button 50; however, the first CCT LED 52 could be provided anywhere on the PWM dimmer 22. As with any of the features described in the embodiments, the first CCT LED 52 may be included with any feature and part of any embodiment. The first CCT LED 52 may be a variable color LED, which can output light of different colors and intensities depending on how it is driven by the control circuitry 26. For example, the first CCT LED 52 may be configured to output light ranging from red to white to blue through a color spectrum in a continuous or graduated fashion. The particular color or brightness of the light provided by the first CCT LED 52 may correspond to the particular CCT level being set by the PWM dimmer 22 in response to a user adjusting the CCT using the CCT button 50.

For example, assume that the PWM dimmer 22 is able to vary the CCT of any associated LED-based luminaires 14 from 3000 K to 5000 K in 100 K increments. When the user has used the CCT button 50 to select the lowest CCT (3000 K), which corresponds to a warmer CCT, the first CCT LED 52 will be driven to emit a red light. When the user has used the CCT button 50 to select the highest CCT (5000 K), which corresponds to a cooler CCT, the first CCT LED 52 will be driven to emit a blue light. When the user has used the CCT button 50 to select the mid-ranged CCT (4000 K), which corresponds to a relatively neutral CCT, the first CCT LED 52 will be driven to emit a white light.

For those relatively warmer CCT levels between 3000 K and 4000 K, the light emitted from the first CCT LED 52 may transition gradually from red to orange to yellow to white, as the CCT level progresses in 100 K increments from 3000 K to 4000 K. For those relatively cooler CCTs levels between 4000 K and 5000 K, the light emitted from the first CCT LED 52 may transition gradually from white to green to blue, as the CCT level progresses in 100 K increments from 4000 K to 5000 K. In an alternative to gradually changing colors along the visible light spectrum to indicate a relative CCT level, the first CCT LED 52 could be driven to change in intensity, wherein the warmer the CCT level, the brighter the red light emitted will be. Conversely, the cooler the CCT level, the brighter the blue light emitted will be. The LED may be off or a very dim red, white, or blue at the mid-range CCT level. Those skilled in the art will recognize various ways to drive the first CCT LED 52 with the control circuitry 26 in a manner that causes the light emitted from the first CCT LED 52 to correspond in output, whether it is color, dimming level, or a combination thereof, to the current CCT level of the LED-based luminaires 14 being controlled by the PWM dimmer 22.

The PWM dimmer 22 may control the first CCT LED 52 to emit light that is indicative of the CCT level continuously, when a user is changing the CCT level using the CCT button 52 and perhaps for a short while thereafter, or on a periodic basis. In the latter case, the first CCT LED 52 may flash periodically to provide an indication of CCT level. The CCT LED 52 may also be controlled to indicate relative dimming levels on a periodic, continuous, or as adjusted basis as well as a status of the PWM dimmer 22 or the associated LED-based luminaires 14.

Figure 11:
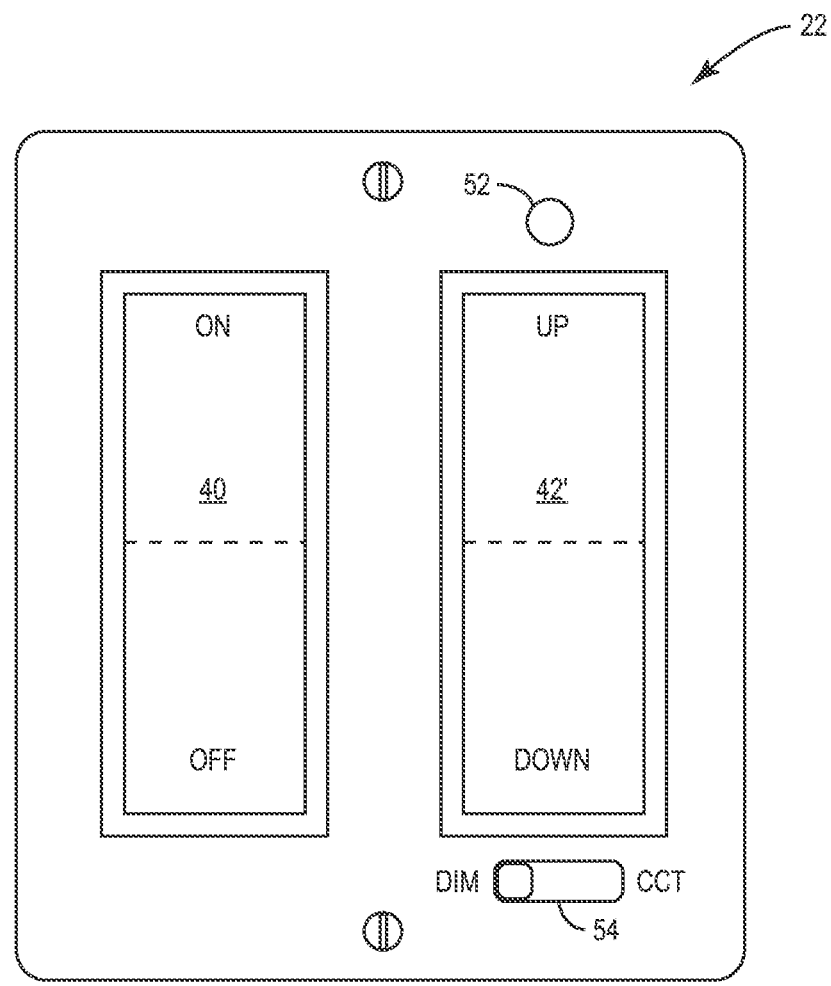
FIG. 11 is a plan view of a PWM dimmer, according to a fifth embodiment.

FIG. 11 illustrates an alternative configuration for the PWM dimmer 22. In essence, the operation and functionality of this PWM dimmer 22 is analogous to that described above in association with FIG. 10. Instead of having a separate dimming button 42 and CCT button 50, a multifunction button 42' is provided along with a selection switch 54. The selection switch 54 can be toggled between a dim mode and a CCT mode. When in the dim mode, the multifunction button 42' operates like the dimming button 42. When in the CCT mode, the multifunction button 42' operates like the CCT button 50. Optionally, the first CCT LED 52 may be provided as described above and used such that the user has feedback as to the current or selected CCT and dimming levels.

Figure 12:
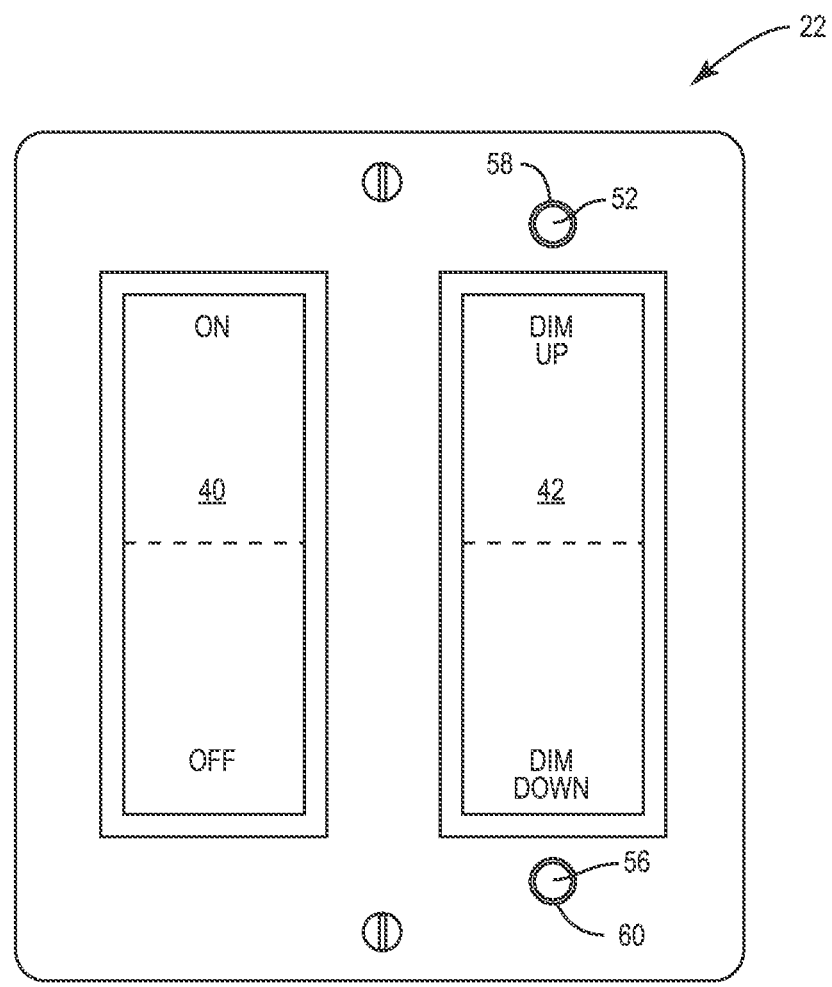
FIG. 12 is a plan view of a PWM dimmer, according to a sixth embodiment.

Another embodiment of the PWM dimmer 22 is illustrated in FIG. 12. The PWM dimmer 22 has an on-off button 40 and a dimming button 42 that operates as described above. The PWM dimmer 22 also includes a first CCT LED 52 and a second CCT LED 56. As illustrated, the first CCT LED 52 is located above the dimming button 42, and the second CCT LED 56 is located below the dimming button 42. The first CCT LED 52 is part of or associated with a first CCT button 58, and the second CCT LED 56 is part of or associated with a second CCT button 60. In the illustrated embodiment, the first CCT LED 52 and first CCT button 58 form a first push button switch, and the second CCT LED 56 and the second CCT button 60 form a second push button switch.

In one embodiment, the PWM dimmer 22 may have minimum and maximum dimming levels that are selectable through interaction with the dimming button 42. The maximum dimming level may be set to 100% of the maximum light output level or less (i.e. 90% of the maximum light output level). The minimum setting may be completely off or at lower dimming level, such as 5% of the maximum light output level. For the purposes of illustration only, assume that the maximum dimming level corresponds to 100% of the maximum light output level and that the minimum dimming level corresponds to 5% of the maximum light output level.

The PWM dimmer 22 allows a user to select a first CCT level for the maximum dimming level using the first CCT button 58 and a second CCT level for the minimum dimming level using the second CCT button 60. The respective first and second CCT LEDs 52, 56 are used to provide feedback for the current or selected maximum and minimum CCT levels, respectively. For example, the first and second CCT LEDs 52, 56 may be controlled to cycle through a series of colors that sweep from red to blue through white to indicate the relative CCT levels (i.e. 3000 K (red), 4000 K (white), and 5000 K (blue)).

The PWM dimmer 22 will thus receive user input via the first and second CCT buttons 58, 60 to set the first and second CCT levels for the corresponding maximum and minimum dimming levels. Once the first and second CCT levels are identified, the CCT level of the lighting fixtures 10 will transition from the second CCT level to the first CCT level as the dimming level changes from the minimum dimming level to the maximum dimming level.

For example, the PWM dimmer 22 may receive user input via the first and second CCT buttons 58, 60 to set the first and second CCT levels to 5000 K and 3000 K, respectively. Assume the corresponding maximum and minimum dimming levels, which are 100% and 5%, respectively. Once the CCT levels are set, the PWM dimmer 22 will send instructions to the lighting fixtures 10 to transition the CCT level from 3000 K to 5000 K as the dimming level changes from the minimum dimming level (5%) to the maximum dimming level (100%). The CCT levels and dimming levels will vary from application to application. Further, the lower dimming levels need not be associated with lower CCT levels, as the inverse may be desired in certain applications.

Figure 13:
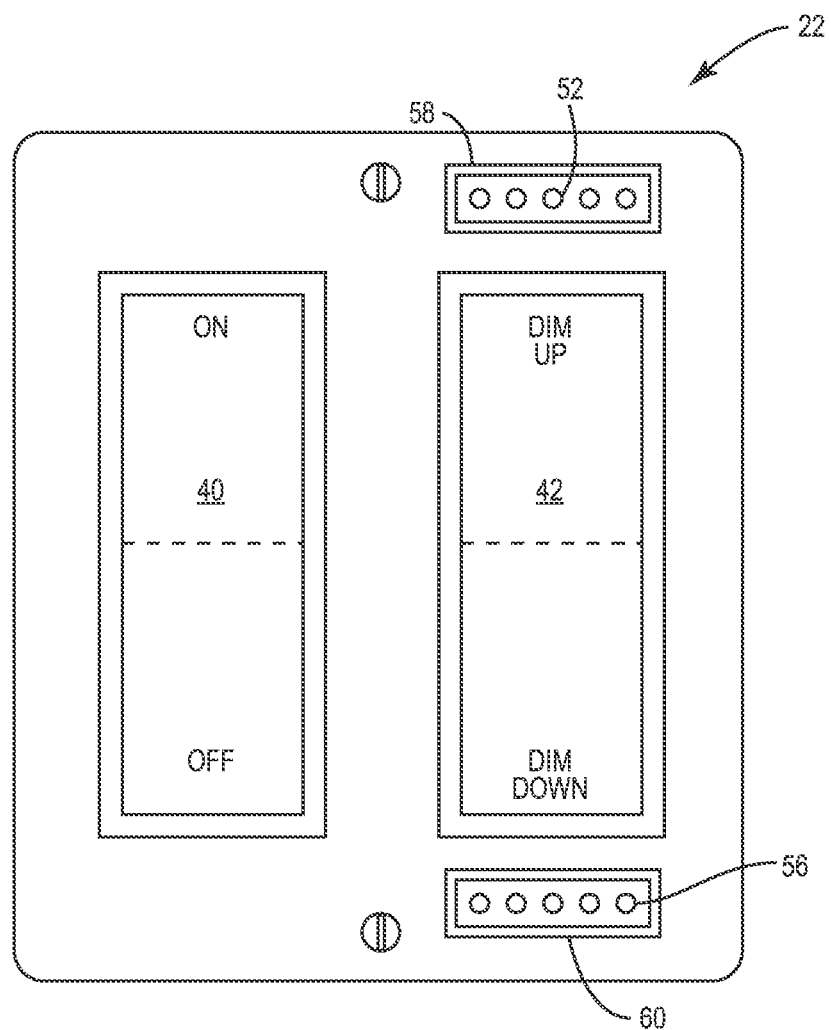
FIG. 13 is a plan view of a PWM dimmer, according to a seventh embodiment.

FIG. 13 illustrates another variation on the concepts of FIG. 12. In this embodiment, the first and second CCT LEDs 52 and 56 are each formed by an array of LEDs. The LEDs in each array may be different colored LEDs or may be controlled to emit different colors of light, which may again transition from red to blue through white or other color spectrum. For example, if the arrays of LEDs have five individual LEDs as shown, the LEDs of the array of LEDs may transition from left to right as follows: red, yellow, white, green, and blue, wherein the CCT level associated with each LED transitions from the minimum CCT level for red to the maximum CCT level for blue. Again, the first and second CCT buttons 58 and 60 need not be integrated with the first and second CCT LEDs 52 and 56. Further, certain buttons on the PWM dimmer 22 may support multiple functions and modes.

Notably, the first and second CCT LEDs 52 and 56 in the embodiments of FIGS. 12 and 13 may also be used to simply set a current CCT level for one or more associated LED-based luminaires 14 by the user. In one mode, the user may set the maximum and minimum CCT levels for the maximum and minimum dimming levels. In another mode, the user may be able to change and set a fixed CCT level, regardless of the dimming level or changes to the dimming level.

In any of the above embodiments, the buttons may alternatively be implemented as one or more buttons on a keypad, rotary dials, sliders, icons on a touch screen display, a capacitive touch interface, and the like. The particular embodiments are provided to simply indicate the range of functionality enabled by the present disclosure.

Figure 14:
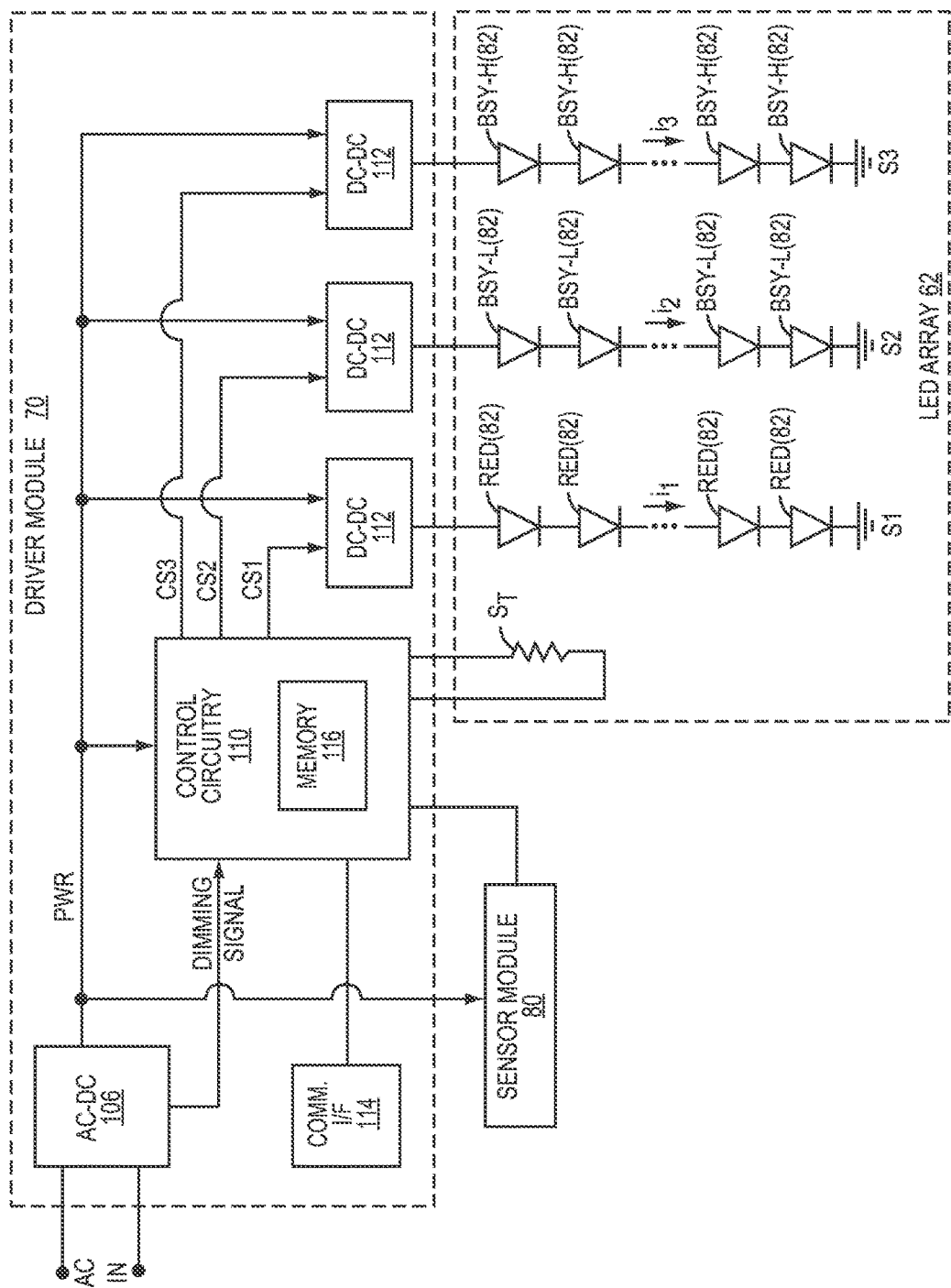
FIG. 14 is a schematic of a driver module and an LED array according to one embodiment of the disclosure.

The following provides details for an LED-based luminaire 14. Notably, the PWM dimmer 22 will work with any number of LED-based luminaires 14, and the one described below is provided as merely one example of such a device. As illustrated in FIG. 14, the LED-based luminaire 14 may generally include an LED array 62, a driver module 70, and a sensor module 80. The driver module 70 is essentially the control system for the LED-based luminaire 14 and functions to drive the LED array 62, based on the AC line signal received from the PWM dimmer 22, fixture control information received from the PWM dimmer 22, information received from other LED-based luminaires 14, the sensor module 80, or any combination thereof. The sensor module 80 may have one or more sensors that sense the same characteristics as the sensors 36, which were described above in association with the PWM dimmer 22.

Figure 15:
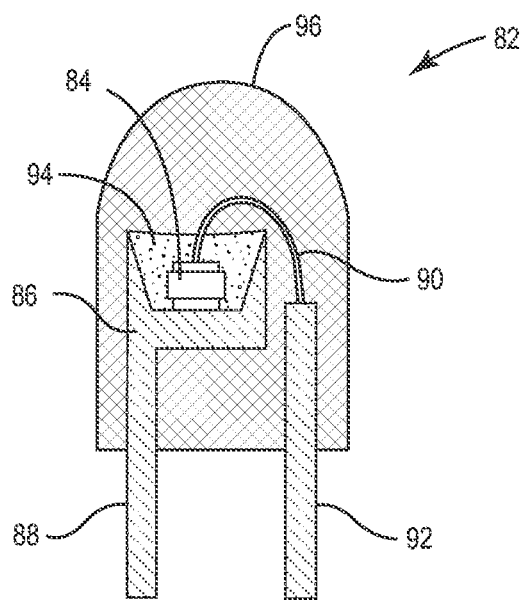
FIG. 15 is a cross section of an exemplary LED according to a first embodiment of the disclosure.

Prior to describing the electronics of the LED-based luminaire 14 in further detail, a discussion of the LEDs that may be used in the LED array 62 of the LED-based luminaire 14 is provided. As noted, the LED array 62 includes a plurality of LEDs, such as the LEDs 82 illustrated in FIGS. 15 and 16. With reference to FIG. 15, a single LED chip 84 is mounted on a reflective cup 86 using solder or a conductive epoxy, such that ohmic contacts for the cathode (or anode) of the LED chip 84 are electrically coupled to the bottom of the reflective cup 86. The reflective cup 86 is either coupled to or integrally formed with a first lead 88 of the LED 82. One or more bond wires 90 connect ohmic contacts for the anode (or cathode) of the LED chip 84 to a second lead 92.

The reflective cup 86 may be filled with an encapsulant material 94 that encapsulates the LED chip 84. The encapsulant material 94 may be clear or contain a wavelength conversion material, such as a phosphor, which is described in greater detail below. The entire assembly is encapsulated in a clear protective resin 96, which may be molded in the shape of a lens to control the light emitted from the LED chip 84.

Figure 16:
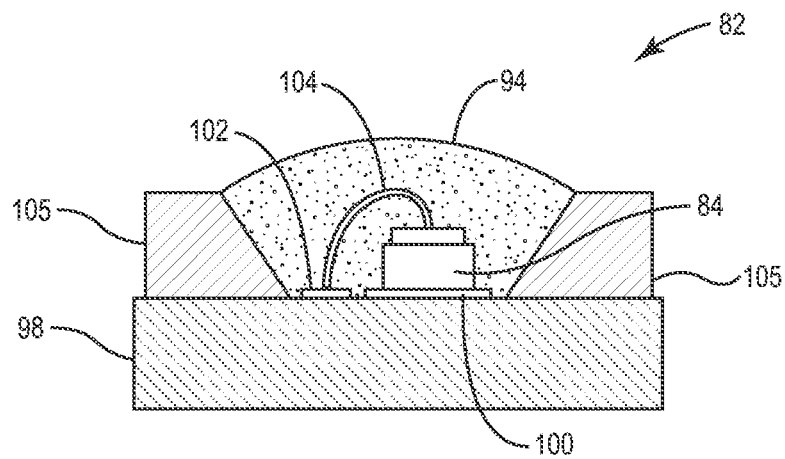
FIG. 16 is a cross section of an exemplary LED according to a second embodiment of the disclosure.

An alternative package for an LED 82 is illustrated in FIG. 16 wherein the LED chip 84 is mounted on a substrate 98. In particular, the ohmic contacts for the anode (or cathode) of the LED chip 84 are directly mounted to first contact pads 100 on the surface of the substrate 98. The ohmic contacts for the cathode (or anode) of the LED chip 84 are connected to second contact pads 102, which are also on the surface of the substrate 98, using bond wires 104. The LED chip 84 resides in a cavity of a reflector structure 105, which is formed from a reflective material and functions to reflect light emitted from the LED chip 84 through the opening formed by the reflector structure 105. The cavity formed by the reflector structure 105 may be filled with an encapsulant material 94 that encapsulates the LED chip 84. The encapsulant material 94 may be clear or contain a wavelength conversion material, such as a phosphor.

In either of the embodiments of FIGS. 15 and 16, if the encapsulant material 94 is clear, the light emitted by the LED chip 84 passes through the encapsulant material 94 and the protective resin 96 without any substantial shift in color.

As such, the light emitted from the LED chip 84 is effectively the light emitted from the LED 82. If the encapsulant material 94 contains a wavelength conversion material, substantially all or a portion of the light emitted by the LED chip 84 in a first wavelength range may be absorbed by the wavelength conversion material, which will responsively emit light in a second wavelength range. The concentration and type of wavelength conversion material will dictate how much of the light emitted by the LED chip 84 is absorbed by the wavelength conversion material as well as the extent of the wavelength conversion. In embodiments where some of the light emitted by the LED chip 84 passes through the wavelength conversion material without being absorbed, the light passing through the wavelength conversion material will mix with the light emitted by the wavelength conversion material. Thus, when a wavelength conversion material is used, the light emitted from the LED 82 is shifted in color from the actual light emitted from the LED chip 84.

For example, the LED array 62 may include a group of BSY or BSG LEDs 82 as well as a group of red LEDs 82. BSY LEDs 82 include an LED chip 84 that emits bluish light, and the wavelength conversion material is a yellow phosphor that absorbs the blue light and emits yellowish light. Even if some of the bluish light passes through the phosphor, the resultant mix of light emitted from the overall BSY LED 82 is yellowish light. The yellowish light emitted from a BSY LED 82 has a color point that falls above the Black Body Locus (BBL) on the 1976 CIE chromaticity diagram wherein the BBL corresponds to the various color temperatures of white light.

Similarly, BSG LEDs 82 include an LED chip 84 that emits bluish light; however, the wavelength conversion material is a greenish phosphor that absorbs the blue light and emits greenish light. Even if some of the bluish light passes through the phosphor, the resultant mix of light emitted from the overall BSG LED 82 is greenish light. The greenish light emitted from a BSG LED 82 has a color point that falls above the BBL on the 1976 CIE chromaticity diagram wherein the BBL corresponds to the various color temperatures of white light.

The red LEDs 82 generally emit reddish light at a color point on the opposite side of the BBL as the yellowish or greenish light of the BSY or BSG LEDs 82. As such, the reddish light from the red LEDs 82 may mix with the yellowish or greenish light emitted from the BSY or BSG LEDs 82 to generate white light that has a desired color temperature and falls within a desired proximity of the BBL. In effect, the reddish light from the red LEDs 82 pulls the yellowish or greenish light from the BSY or BSG LEDs 82 to a desired color point on or near the BBL. Notably, the red LEDs 82 may have LED chips 84 that natively emit reddish light wherein no wavelength conversion material is employed. Alternatively, the LED chips 84 may be associated with a wavelength conversion material, wherein the resultant light emitted from the wavelength conversion material and any light that is emitted from the LED chips 84 without being absorbed by the wavelength conversion material mixes to form the desired reddish light.

The blue LED chip 84 used to form either the BSY or BSG LEDs 82 may be formed from a gallium nitride (GaN), indium gallium nitride (InGaN), silicon carbide (SiC), zinc selenide (ZnSe), or like material system. The red LED chip 84 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 601 Washington Road, Princeton, N.J. 08580, and the like. The above LED architectures, phosphors, and material systems are merely exemplary and are not intended to provide an exhaustive listing of architectures, phosphors, and materials systems that are applicable to the concepts disclosed herein. For example, the LEDs 82 may include a first group of LED chips 84 that emits bluish light and has a yellow or green phosphor (BSY and/or BSG) and a second group of LED chips 84 that emits a blue light and has a red phosphor (BSR).

Figure 17:
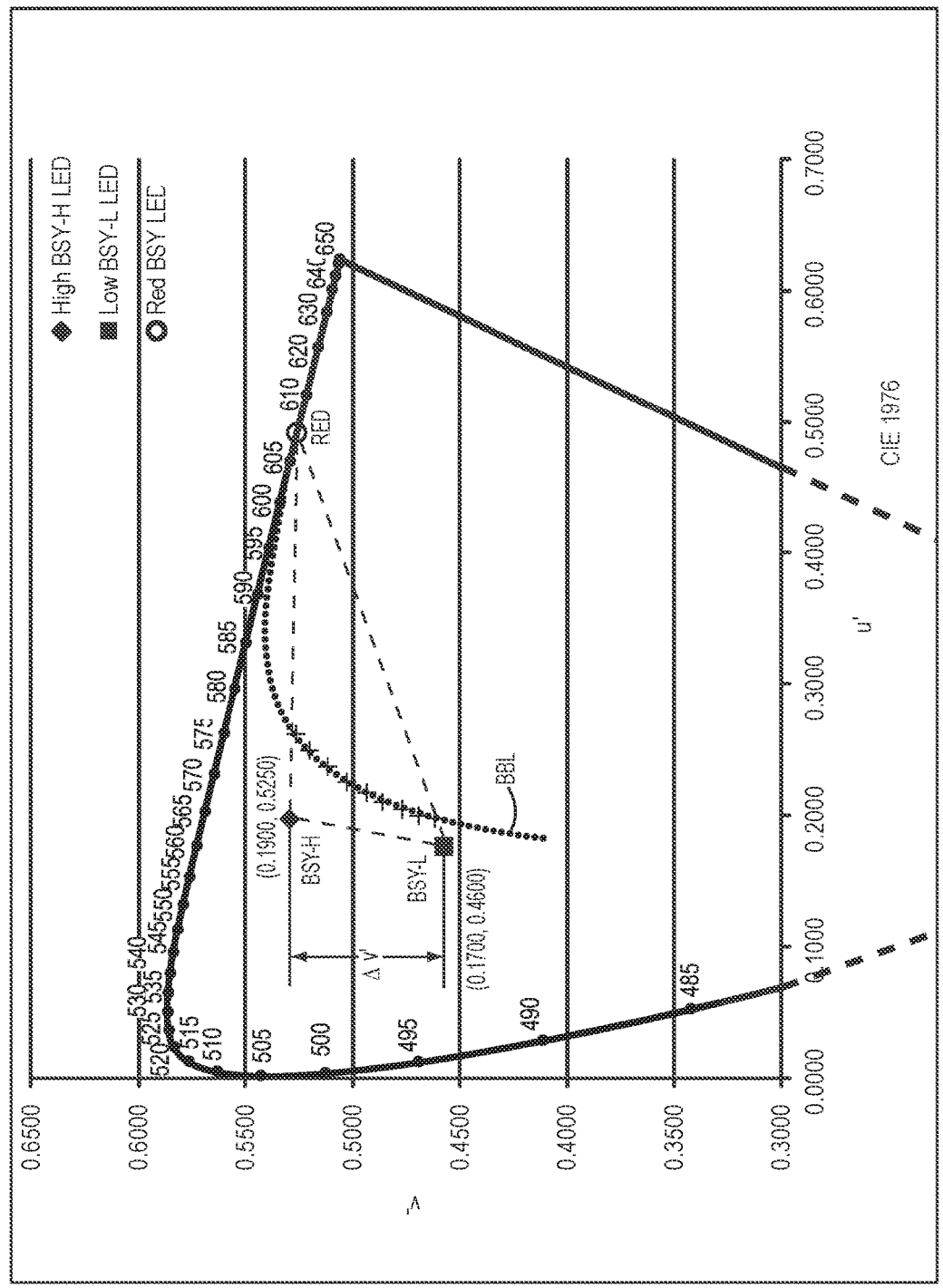
FIG. 17 is a CIE 1976 chromaticity diagram that illustrates the color points for three different LEDs and a black body locus.

The International Commission on Illumination (Commission internationale de l'éclairage, or CIE) has defined various chromaticity diagrams over the years. The chromaticity diagrams are used to project a color space that represents all human perceivable colors without reference to brightness or luminance. FIG. 17 illustrates a CIE 1976 chromaticity diagram, which includes a portion of a Planckian locus, or black body locus (BBL). The BBL is a path within the color space that the color of an incandescent black body would travel as the temperature of the black body changes. While the color of the incandescent body may range from an orangish-red to blue, the middle portions of the path encompass what is traditionally considered as "white light."

Correlated Color Temperature (CCT), or color temperature, is used to characterize white light. CCT is measured in kelvin (K) and defined by the Illuminating Engineering Society of North America (IESNA) as "the absolute temperature of a blackbody whose chromaticity most nearly resembles that of the light source." Light output that is:

below 3600 K is a yellowish white and generally considered to be warm (white) light;

between 3600 K and 8000 K is generally considered neutral (white) light; and above 8000 K is bluish-white and generally considered to be cool (white) light.

The coordinates (u', v') are used to define color points within the color space of the CIE 1976 chromaticity diagram. The v' value defines a vertical position and the u' value defines a horizontal position. As an example, the color points for a first BSY LED 82 is about (0.1900, 0.5250), a second BSY LED 82 is about (0.1700, 0.4600), and a red LED 82 is about (0.4900, 0.5600). In this example, the first and second BSY LEDs 82 are significantly spaced apart from one another along the v' axis; however, such spacing is not necessary. As such, the first BSY LED 82 is much higher than the second BSY LED 82 in the chromaticity diagram. For ease of reference, the higher, first BSY LED 82 is referenced as the high BSY-H LED, and the lower, second BSY LED 82 is referenced as the low BSY-L LED.

As such, the Δv' for the high BSY-H LED and the low BSY-L LED is about 0.065 in the illustrated example. In different embodiments, the Δv' may be greater than 0.025, 0.070, 0.033, 0.080, 0.050, 0.060, 0.075, 0.100, 0.110, and 0.160, respectively. Exemplary, but not absolute upper bounds for Δv' may be 0.150, 0.175, or 0.600 for any of the aforementioned lower bounds. For groups of LEDs of a particular color, the Δv' between two groups of LEDs is the difference between the average v' values for each group of LEDs. As such, the Δv' between groups of LEDs of a particular color may also be greater than 0.070, 0.033, 0.080, 0.050, 0.060, 0.075, 0.100, 0.110, and 0.160, respectively, with the same upper bounds as described above. Further, the variation of color points among the LEDs 82 within a particular group of LEDs may be limited to within a seven, five, four, three, or two-step MacAdam ellipse in certain embodiments. In general, the greater the delta v', the larger the range through which the CCT of the white light can be adjusted along the black body locus. The closer the white light is to the black body locus, the more closely the white light will replicate that of an incandescent radiator.

In one embodiment, the LED array 62 includes a first LED group of only low BSY-L LEDs, a second LED group of only high BSY-H LEDs, and a third LED group of only red LEDs. The currents used to drive the first, second, and third LED groups may be independently controlled such that the intensity of the light output from the first, second, and third LED groups is independently controlled. As such, the light output for the first, second, and third LED groups may be blended or mixed to create a light output that has an overall color point virtually anywhere within a triangle formed by the color points of the respective low BSY-L LEDs, high BSY-H LEDs, and the red LEDs. Within this triangle resides a significant portion of the BBL, and as such, the overall color point of the light output may be dynamically adjusted to fall along the portion of the BBL that resides within the triangle.

A crosshatch pattern highlights the portion of the BBL that falls within the triangle. Adjusting the overall color point of the light output along the BBL corresponds to adjusting the CCT of the light output, which as noted above is considered white light when falling on the BBL. In one embodiment, the CCT of the overall light output may be adjusted over a range from about 2700 K to about 5700 K. In another embodiment, the CCT of the overall light output may be adjusted over a range from about 7000 K to 5000 K. In yet another embodiment, the CCT of the overall light output may be adjusted over a range from about 2700 K to 5000 K. In yet another embodiment, the CCT of the overall light output may be adjusted over a range from about 7000 K to 8000 K. These variations in CCT can be accomplished while maintaining a high color rendering index value (CRI), such as a CRI equal to or greater than 90.

To be considered "white" light, the overall color point does not have to fall precisely on the BBL. Unless defined otherwise and for the purposes of this application only, a color point within a five-step MacAdam ellipse of the BBL is defined as white light on the BBL. For tighter tolerances, four, three, and two-step MacAdam ellipses may be defined.

In this example, the LED array 62 may include a mixture of red LEDs 82, high BSY-H LEDs 82, and low BSY-L LEDs 82, although other designs may include two or more than three different types of LEDs. With reference to FIG. 14, the LED array 62 may be divided into multiple strings of series connected LEDs 82. In essence, LED string S1, which includes a number of red LEDs (RED), forms a first group of LEDs 82. LED string S2, which includes a number of low BSY LEDs (BSY-L), forms a second group of LEDs 82. And, LED string S3, which includes a number of high BSY LEDs (BSY-H), forms a third group of LEDs 82.

For clarity, the various LEDs 82 of the LED array 62 are referenced as RED, BSY-L, and BSY-H in FIG. 14 to clearly indicate which LEDs are located in the various LED strings S1, S2, and S3. While BSY LEDs 82 are illustrated, BSG or other phosphor-coated, wavelength converted LEDs may be employed in analogous fashion. For example, a string of high BSG-H LEDs 82 may be combined with a string of low BSG-L LEDs 82, and vice versa. Further, a string of low BSY-H LEDs may be combined with a string of high BSG-H LEDs, and vice versa. Non-phosphor-coated LEDs, such as non-wavelength converted red, green, and blue LEDs, may also be employed in certain embodiments.

In general, the driver module 70 controls the currents $i_1$, $i_2$, and $i_3$, which are used to drive the respective LED strings S1, S2, and S3. The ratio of currents $i_1$, $i_2$, and $i_3$ that are provided through respective LED strings S1, S2, and S3 may be adjusted to effectively control the relative intensities of the reddish light emitted from the red LEDs 82 of LED string S1, the yellowish/greenish light emitted from the low BSY-L LEDs 82 of LED string S2, and the yellow/greenish light emitted from the high BSY-H LEDs 82 of LED string S3. The resultant light from each LED string S1, S2, and S3 mixes to generate an overall light output that has a desired color, CCT, and intensity, the latter of which may also be referred to as a dimming level. As noted, the overall light output may be white light that falls on or within a desired proximity of the BBL and has a desired CCT.

The number of LED strings Sx may vary from one to many and different combinations of LED colors may be used in the different strings. Each LED string Sx may have LEDs 82 of the same color, variations of the same color, or substantially different colors. In the illustrated embodiment, each LED string S1, S2, and S3 is configured such that all of the LEDs 82 that are in the string are all essentially identical in color. However, the LEDs 82 in each string may vary substantially in color or be completely different colors in certain embodiments. In another embodiment, three LED strings Sx with red, green, and blue LEDs may be used, wherein each LED string Sx is dedicated to a single color. In yet another embodiment, at least two LED strings Sx may be used, wherein different colored BSY or BSG LEDs are used in one of the LED strings Sx and red LEDs are used in the other of the LED strings Sx. A single string embodiment is also envisioned, where currents may be individually adjusted for the LEDs of the different colors using bypass circuits, or the like.

The driver module 70 depicted in FIG. 14 generally includes AC-DC conversion circuitry 106, control circuitry 110, and a number of current sources, such as the illustrated DC-DC converters 112. The AC-DC conversion circuitry 106 is adapted to receive an AC power signal (AC IN), rectify the AC power signal, correct the power factor of the AC power signal, and provide a DC output signal. The DC output signal may be used to directly power the control circuitry 110 and any other circuitry provided in the driver module 70, including the DC-DC converters 112, a communication interface 114, as well as the sensor module 80.

As illustrated, the three respective DC-DC converters 112 of the driver module 70 provide currents $i_1$, $i_2$, and $i_3$ for the three LED strings S1, S2, and S3 in response to control signals CS1, CS2, and CS3. The control signals CS1, CS2, and CS3 may be pulse width modulated (PWM) signals that effectively turn the respective DC-DC converters on during a logic high state and off during a logic low state of each period of the PWM signal. In one embodiment, the control signals CS1, CS2, and CS3 are the product of two PWM signals.

The first PWM signal is a higher frequency PWM signal that has a duty cycle that effectively sets the DC current level through a corresponding one of LED strings S1, S2, and S3, when current is allowed to pass through the LED strings S1, S2, and S3. The second PWM signal is a lower frequency signal that has a duty cycle that corresponds to a desired dimming or overall output level. In essence, the higher frequency PWM signals set the relative current levels through each LED string S1, S2, and S3 while the lower frequency PWM signal determines how long the currents $i_1$, $i_2$, and $i_3$ are allowed to pass through the LED strings S1, S2, and S3 during each period of the lower frequency PWM signal. The longer the currents $i_1$, $i_2$, and $i_3$ are allowed to flow through the LED strings S1, S2, and S3 during each period, the higher the output level, and vice versa. Given the reactive components associated with the DC-DC converters 112, the relative current levels set with the higher frequency PWM signals may be filtered to a relative DC current. However, this DC current is essentially pulsed on and off based on the duty cycle of the lower frequency PWM signal. For example, the higher frequency PWM signal may have a switching frequency of around 600 KHz, while the lower frequency PWM signal may have a switching frequency of around 1 KHz.

As described above, the PWM dimmer 22 may control the AC power signal. The AC-DC conversion circuitry 106 may be configured to detect the relative amount of dimming associated with the AC power signal, based on the RMS value of the AC power signal, and provide a corresponding dimming signal to the control circuitry 110. Based on the dimming signal, the control circuitry 110 will adjust the currents $i_1$, $i_2$, and $i_3$ provided to each of the LED strings S1, S2, and S3 to effectively reduce the intensity of the resultant light emitted from the LED strings S1, S2, and S3 while maintaining the desired CCT. The CCT and dimming levels may be initiated internally or received from the PWM dimmer 22, terminal device TD, or another lighting circuit 10 by analyzing the AC power signal or via the communication interface 114. The driver module 70 will respond by controlling the currents $i_1$, $i_2$, and $i_3$ in the desired manner to achieve the requested CCT and/or dimming levels.

The intensity and CCT of the light emitted from the LEDs 82 may be affected by temperature. If associated with a thermistor $S_T$ or other temperature-sensing device, the control circuitry 110 can control the currents $i_1$, $i_2$, and $i_3$ provided to each of the LED strings S1, S2, and S3 based on ambient temperature of the LED array 62 in an effort to compensate for temperature effects. The control circuitry 110 may also monitor the output of the occupancy and ambient light sensors $S_O$ and $S_A$ for occupancy and ambient light information and further control the currents $i_1$, $i_2$, and $i_3$ in a desired fashion. Each of the LED strings S1, S2, and S3 may have different temperature compensation adjustments, which may also be functions of the magnitude of the various currents $i_1$, $i_2$, and $i_3$.

Figure 18:
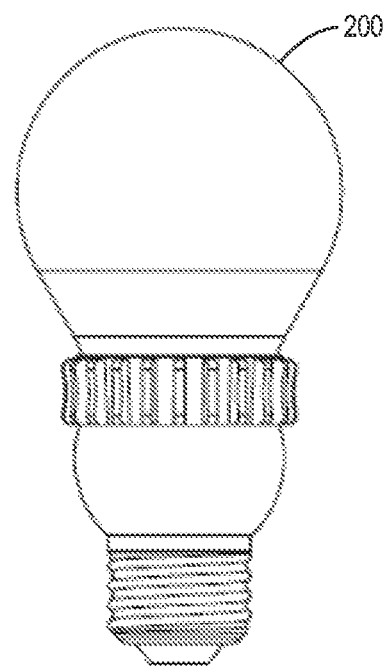
FIG. 18 illustrates an omnidirectional light bulb according to one embodiment of the disclosure.
Figure 19:
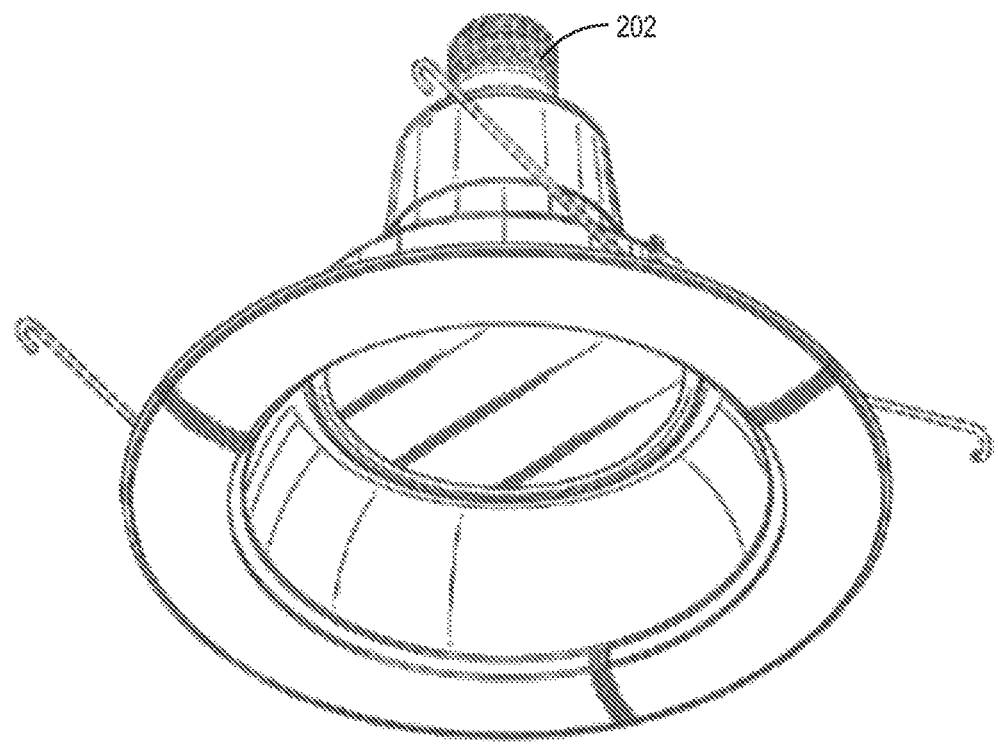
FIG. 19 illustrates a downlight according to one embodiment of the disclosure.
Figure 20:
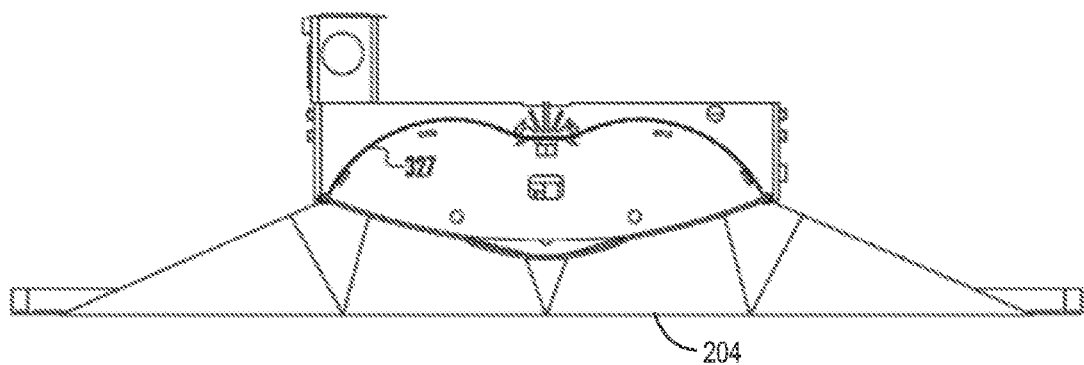
FIG. 20 illustrates a troffer light fixture according to one embodiment of the disclosure.

Embodiments described herein have particular utility in various luminaire forms. For example, each of the embodiments disclosed herein may be alternatively implemented in various types of solid state luminaires including, for example, downlights, troffers, streetlights, canopy lights, parking garage lights, lights that use waveguide technology, and other lighting fixtures. FIG. 18 illustrates an omnidirectional light bulb 200, such as an A19 bulb. Other similar consumer lights, such as PAR, BR, and candelabra bulbs, can also implement the embodiments described herein. Example luminaires are described in U.S. Pat. Nos. 8,591,062 and 8,596,819 and U.S. patent application Ser. No. 14/306,342, each of which are incorporated herein by reference. FIG. 19 shows another downlight 202 that can incorporate the embodiments described herein. An example of such a down light is disclosed in U.S. Pat. No. 8,777,449 incorporated herein by reference. FIG. 20 illustrates a troffer light fixture 204 that can incorporate the embodiments described herein. An example troffer light fixture is disclosed in U.S. Published Patent Publication No. US2012/0327650, herein incorporated by reference.

Figure 21:
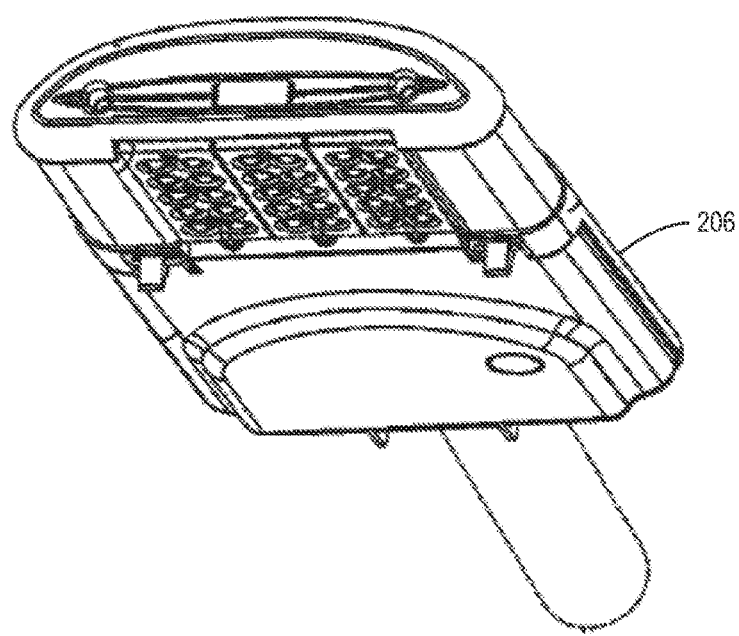
FIG. 21 illustrates a solid state streetlight according to one embodiment of the disclosure.

In another example, FIG. 21 illustrates a solid state streetlight 206 according to further embodiments of the disclosure. The streetlight may be implemented according to any of the above-described embodiments of the disclosure.

Figure 22:
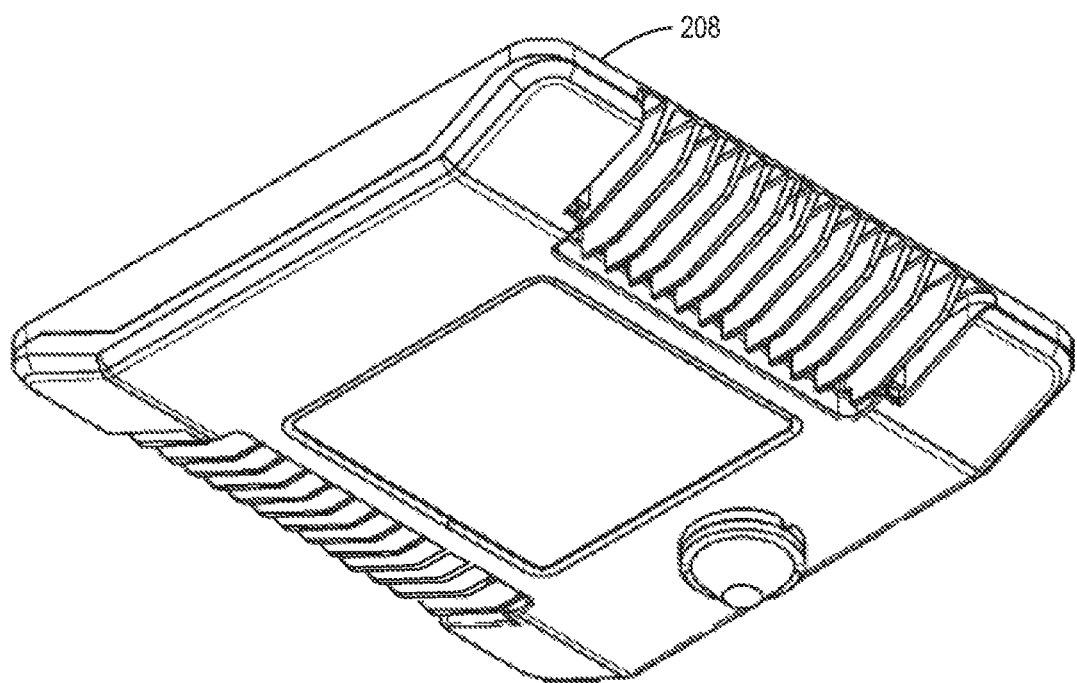
FIG. 22 illustrates a canopy light according to one embodiment of the disclosure.

Other streetlights and outdoor luminaires that can be implemented using the above-described embodiments of the present invention include the lights disclosed in U.S. Pat. No. 8,622,584; U.S. Pat. No. 8,425,071; U.S. Pat. No. 9,028,087; and U.S. Patent Publication No. 2015/0253488, each of which are incorporated herein by reference. Finally, FIG. 22 illustrates a canopy light 208 according to some embodiments of the disclosure. An example canopy light incorporating the embodiments described herein is described in U.S. Pat. No. 9,182,096, herein incorporated by reference. Embodiments of the disclosure may also be implemented in various other luminaires, such as, for example, in the waveguide-based troffers disclosed in U.S. Patent Publication No. 2014/0347885, in the troffer style fixtures disclosed in U.S. Patent Publication No. 2012/0051041 and/or in the waveguide based garage luminaires disclosed in U.S. Patent Publication No. 2014/0355302, each of which are incorporated herein by reference. Other and similar luminaires can be implemented using the above-described circuitry.

Those skilled in the art will recognize improvements and modifications to the embodiments of the present disclosure. All such improvements and modifications are considered within the scope of the concepts disclosed herein and the claims that follow.

What is claimed is:

1. A pulse width modulated (PWM) dimmer comprising:
   a source terminal;
   a load terminal;
   a power stage coupled between the source terminal and the load terminal and configured to receive from the source terminal an AC supply signal having an envelope with a positive half-cycle and a negative half-cycle for each cycle and provide to the load terminal a pulsed AC load signal that tracks the envelope and comprises a plurality of pulses in each of the positive half-cycle and the negative half-cycle for each cycle based on a control signal;
   an interface configured to receive dimming control information bearing on a dimming level; and
   control circuitry configured to receive the dimming control information from the interface and generate the control signal based on the dimming control information, wherein an RMS value of the pulsed AC load signal varies as the dimming level varies and corresponds to the dimming level.

2. The PWM dimmer of claim 1 wherein a duty cycle of the pulsed AC load signal varies as the dimming level varies.

3. The PWM dimmer of claim 2 wherein the control signal is a PWM signal that corresponds with the pulsed AC load signal.

4. The PWM dimmer of claim 1 wherein when the AC supply signal is at a magnitude less than a defined threshold, the pulsed AC load signal corresponds directly with the AC supply signal.

5. The PWM dimmer of claim 1 wherein the interface comprises a wireless communication interface configured to:
   wirelessly receive information indicative of the dimming level and transmitted from a terminal device; and
   provide the dimming control information bearing on the dimming level to the control circuitry.

6. The PWM dimmer of claim 1 wherein the interface comprises a user input interface configured to directly receive human input indicative of the dimming level and provide the dimming control information bearing on the dimming level to the control circuitry.

7. The PWM dimmer of claim 6 wherein the interface further comprises a communication interface configured to transmit fixture control information indicative of the dimming level and intended for at least one remote lighting fixture, wherein:
   in a first mode, the control circuitry causes the power stage to provide the pulsed AC load signal to the load terminal, such that the RMS value of the pulsed AC load signal varies as the dimming level varies and corresponds to the dimming level; and
   in a second mode, the control circuitry causes the power stage to pass the AC supply signal substantially unaltered to the load terminal and causes the communication interface to transmit the fixture control information indicative of the dimming level to the at least one remote lighting fixture, wherein the at least one remote lighting fixture outputs light at the dimming level.

8. The PWM dimmer of claim 7 wherein the communication interface is a wireless communication interface and the fixture control information is transmitted wirelessly.

9. The PWM dimmer of claim 7 wherein the user input interface is further configured to directly receive human input indicative of a correlated color temperature, CCT, and provide color control information bearing on the CCT to the control circuitry, and in the second mode, the control circuitry causes the communication interface to transmit fixture control information indicative of the CCT to the at least one remote lighting fixture, wherein the at least one remote lighting fixture outputs light at the CCT.

10. The PWM dimmer of claim 7 wherein the communication interface is a wireless communication interface and the fixture control information is transmitted wirelessly.

11. The PWM dimmer of claim 7 wherein the user input interface is further configured to directly receive human input indicative of a value for a variable lighting parameter and provide parameter control information bearing on the value for the variable lighting parameter to the control circuitry, and in the second mode, the control circuitry causes the communication interface to transmit fixture control information indicative of the value of the variable lighting parameter to the at least one remote lighting fixture, wherein the at least one remote lighting fixture outputs light according to the value for the variable lighting parameter.

12. The PWM dimmer of claim 6 wherein the user input interface comprises at least one of a mechanical switch, mechanical rotary dial, and a mechanical slider for receiving the human input.

13. The PWM dimmer of claim 6 wherein the user input interface comprises at least one of a capacitive touch interface and a touch screen for receiving the human input.

14. The PWM dimmer of claim 1 wherein the interface comprises:
   a user input interface configured to directly receive human input indicative of a correlated color temperature, CCT, and provide color control information bearing on the CCT to the control circuitry; and
   a communication interface configured to transmit fixture control information indicative of the CCT and intended for at least one remote lighting fixture, wherein:
      in a first mode, the control circuitry causes the power stage to provide the pulsed AC load signal to the load terminal, such that the RMS value of the pulsed AC load signal varies as the dimming level varies and corresponds to the dimming level; and
      in a second mode, the control circuitry causes the power stage to pass the AC supply signal substantially unaltered to the load terminal and causes the communication interface to transmit the color control information indicative of the CCT to the at least one remote lighting fixture, wherein the at least one remote lighting fixture outputs light at the CCT based on the fixture control information indicative of the CCT.

15. The PWM dimmer of claim 1 further comprising a sensor associated with the control circuitry, which is further configured to provide the control signal based on a sensor signal received from the sensor.

16. The PWM dimmer of claim 1 wherein when the dimming level corresponds to a maximum light output level, the control circuitry causes the power stage to pass the AC supply signal substantially unaltered to the load terminal.

17. The PWM dimmer of claim 1 further comprising a power supply configured to convert the AC supply signal to a DC supply signal, which is used to power the control circuitry.

18. The PWM dimmer of claim 1 further comprising:
   a housing in which the power stage, the interface, and the control circuitry reside; and
   a pair of mounting tabs, wherein the housing is physically configured to be received by a wall-mounted, electrical junction box, and openings through mounting tabs align with respective mounting holes associated with the junction box.

19. A pulse width modulated (PWM) dimmer comprising:
   a source terminal;
   a load terminal;
   a power stage coupled between the source terminal and the load terminal and configured to receive from the source terminal an AC supply signal having an envelope with a positive half-cycle and a negative half-cycle for each cycle and provide to the load terminal a pulsed AC load signal that tracks the envelope and comprises a plurality of pulses in each of the positive half-cycle and the negative half-cycle for each cycle based on a control signal;
   an interface configured to receive dimming control information bearing on a dimming level; and
   control circuitry configured to receive the dimming control information from the interface and generate the control signal based on the dimming control information, wherein an RMS value of the pulsed AC load signal varies as the dimming level varies and corresponds to the dimming level; a duty cycle of the pulsed AC load signal varies as the dimming level varies; and the control signal is a PWM signal that corresponds with the pulsed AC load signal.

20. The PWM dimmer of claim 19 wherein when the AC supply signal is at a magnitude less than a defined threshold, and the pulsed AC load signal corresponds directly with the AC supply signal.

21. The PWM dimmer of claim 19 wherein the interface further comprises a user input interface configured to directly receive human input indicative of the dimming level and provide the dimming control information bearing on the dimming level to the control circuitry.

22. The PWM dimmer of claim 21 wherein the interface further comprises a wireless communication interface configured to transmit fixture control information indicative of the dimming level and intended for at least one remote lighting fixture, wherein:
   in a first mode, the control circuitry causes the power stage to provide the pulsed AC load signal to the load terminal, such that the RMS value of the pulsed AC load signal varies as the dimming level varies and corresponds to the dimming level; and in a second mode, the control circuitry causes the power stage to pass the AC supply signal substantially unaltered to the load terminal and causes the communication interface to transmit the fixture control information indicative of the dimming level to the at least one remote lighting fixture, wherein the at least one remote lighting fixture outputs light at the dimming level.

23. The PWM dimmer of claim 22 wherein the user input interface is further configured to directly receive human input indicative of a CCT and provide color control information bearing on the CCT to the control circuitry, and in the second mode, the control circuitry causes the communication interface to transmit fixture control information indicative of the CCT to the at least one remote lighting fixture, wherein the at least one remote lighting fixture outputs light at the CCT.

24. A pulse width modulated (PWM) dimmer comprising:
a source terminal;
a load terminal;
a power stage coupled between the source terminal and the load terminal and configured to receive from the source terminal an AC supply signal and provide to the load terminal an AC load signal;
a user input interface configured to, in a first mode, directly receive human input indicative of a dimming level and provide dimming control information bearing on the dimming level;
a communication interface configured to, in a second mode, transmit fixture control information indicative of the dimming level and intended for at least one remote lighting fixture; and
control circuitry configured to:
receive the dimming control information;
in a first mode, cause the power stage to provide the AC load signal to the load terminal, such that an RMS value of the AC load signal varies as the dimming level varies and corresponds to the dimming level; and
in a second mode, cause the power stage to pass the AC supply signal substantially unaltered to the load terminal and cause the communication interface to transmit the fixture control information indicative of the dimming level to the at least one remote lighting fixture, wherein the at least one remote lighting fixture outputs light at the dimming level.

25. The PWM dimmer of claim 24 wherein the communication interface is a wireless communication interface and the fixture control information is transmitted wirelessly.

26. The PWM dimmer of claim 24 wherein the user input interface is further configured to directly receive human input indicative of a correlated color temperature, CCT, and provide color control information bearing on the CCT to the control circuitry, and in the second mode, the control circuitry causes the communication interface to transmit fixture control information indicative of the CCT to the at least one remote lighting fixture, wherein the at least one remote lighting fixture outputs light at the CCT.

27. The PWM dimmer of claim 24 wherein the user input interface is further configured to directly receive human input indicative of a value for a variable lighting parameter and provide parameter control information bearing on the value for the variable lighting parameter to the control circuitry, and in the second mode, the control circuitry causes the communication interface to transmit fixture control information indicative of the value of the variable lighting parameter to the at least one remote lighting fixture, wherein the at least one remote lighting fixture outputs light according to the value for the variable lighting parameter.

28. A PWM dimmer comprising a user input interface configured to receive user input related to a desired dimming level and a power stage configured to receive an AC supply signal and provide a pulsed AC load signal based on the desired dimming level, wherein the pulsed AC load signal comprises a plurality of pulses in at least one of a positive half-cycle and a negative half-cycle for each cycle and an RMS value of the pulsed AC load signal varies as the dimming level varies and corresponds to the dimming level.

29. The PWM dimmer of claim 28 wherein a duty cycle of the AC load signal corresponds to the dimming level and varies as the dimming level varies.

* * * * *